(12) United States Patent
Ryu et al.

(10) Patent No.: US 11,476,970 B2
(45) Date of Patent: *Oct. 18, 2022

(54) METHOD AND APPARATUS FOR PERFORMING COMMUNICATION BY D2D COMMUNICATION TERMINAL

(71) Applicant: Samsung Electronics Co., Ltd., Suwon-si (KR)

(72) Inventors: Hyunseok Ryu, Yongin-si (KR); Seunghoon Park, Seoul (KR); Peng Xue, Hwaseong-si (KR); Hyunkyu Yu, Suwon-si (KR); Cheol Jeong, Seongnam-si (KR); Sangwon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

This patent is subject to a terminal disclaimer.

(21) Appl. No.: 16/738,382

(22) Filed: Jan. 9, 2020

(65) Prior Publication Data
US 2020/0153536 A1 May 14, 2020

Related U.S. Application Data

(63) Continuation of application No. 15/819,517, filed on Nov. 21, 2017, now Pat. No. 10,541,776, which is a
(Continued)

(30) Foreign Application Priority Data

May 9, 2014 (KR) .................. 10-2014-0055928
Jun. 26, 2014 (KR) .................. 10-2014-0079196
Sep. 25, 2014 (KR) .................. 10-2014-0128338

(51) Int. Cl.
*H04W 8/00* (2009.01)
*H04L 1/00* (2006.01)
(Continued)

(52) U.S. Cl.
CPC .............. *H04L 1/00* (2013.01); *H04L 1/0009* (2013.01); *H04L 1/08* (2013.01); *H04W 52/18* (2013.01);
(Continued)

(58) Field of Classification Search
None
See application file for complete search history.

(56) References Cited

U.S. PATENT DOCUMENTS 9,974,066 B2* 5/2018 Novlan ............... H04W 56/002
9,992,781 B2* 6/2018 Chatterjee ......... H04W 28/0215
(Continued)

FOREIGN PATENT DOCUMENTS

CN  101057516 A  10/2007
CN  102204203 A   9/2011
(Continued)

OTHER PUBLICATIONS

U.S. Appl. No. 61/950,842 (Year: 2014).*
(Continued)

*Primary Examiner* — Sithu Ko
(74) *Attorney, Agent, or Firm* — Jefferson IP Law, LLP

(57) ABSTRACT

A method of controlling transmission power of a terminal performing device to device (D2D) communication in a wireless communication system, the method including receiving power control information corresponding to radio resources used for the D2D communication by the terminal from a base station, determining a first transmission power of the radio resources to be used for the D2D communication by the terminal among the radio resources, and transmitting data for the D2D communication with the determined first transmission power by using the radio resource to be used for the D2D communication by the terminal.

16 Claims, 19 Drawing Sheets

Related U.S. Application Data continuation of application No. 14/707,548, filed on May 8, 2015, now Pat. No. 9,847,848.

(51) Int. Cl.
*H04W 52/18* (2009.01)
*H04W 72/04* (2009.01)
*H04W 52/38* (2009.01)
*H04L 1/08* (2006.01)
*H04W 76/14* (2018.01)

(52) U.S. Cl.
CPC ..... *H04W 52/383* (2013.01); *H04W 72/0473* (2013.01); *H04W 76/14* (2018.02)

(56) References Cited

U.S. PATENT DOCUMENTS

| | | | |
|---|---|---|---|
| 2008/0074999 A1 | 3/2008 | Usuda et al. | |
| 2009/0011770 A1 | 1/2009 | Jung et al. | |
| 2010/0113004 A1 | 5/2010 | Cave et al. | |
| 2012/0028672 A1 | 2/2012 | Chen et al. | |
| 2013/0157676 A1 | 6/2013 | Baek et al. | |
| 2013/0310103 A1 | 11/2013 | Madan et al. | |
| 2013/0329711 A1 | 12/2013 | Seo et al. | |
| 2014/0056220 A1 | 2/2014 | Poitau et al. | |
| 2014/0086157 A1 | 3/2014 | Bontu et al. | |
| 2014/0094213 A1 | 4/2014 | Khoshnevis | |
| 2014/0119306 A1 | 5/2014 | Yang et al. | |
| 2014/0274196 A1 | 9/2014 | Dai et al. | |
| 2015/0043448 A1* | 2/2015 | Chatterjee | H04W 76/27 370/329 |
| 2015/0078279 A1 | 3/2015 | Ko et al. | |
| 2015/0173113 A1* | 6/2015 | Liu | H04W 8/005 370/329 |
| 2015/0189487 A1 | 7/2015 | Morita | |
| 2015/0201392 A1* | 7/2015 | Sartori | H04W 60/00 370/329 |
| 2015/0245323 A1 | 8/2015 | You et al. | |
| 2015/0264677 A1* | 9/2015 | He | H04W 48/12 370/312 |
| 2016/0255615 A1* | 9/2016 | Chatterjee | H04W 28/08 370/330 |
| 2016/0295565 A1 | 10/2016 | Kim et al. | |
| 2016/0323869 A1 | 11/2016 | Xu et al. | |
| 2017/0027011 A1* | 1/2017 | Chae | H04W 52/10 |

FOREIGN PATENT DOCUMENTS

| | | |
|---|---|---|
| CN | 102348272 A | 2/2012 |
| KR | 10-2013-0121052 A | 11/2013 |
| KR | 10-2013-0137643 A | 12/2013 |
| WO | 2013/012215 A1 | 1/2013 |
| WO | 2013/078946 A1 | 6/2013 |
| WO | 2013/108114 A1 | 7/2013 |

OTHER PUBLICATIONS

Chen Xu et al: "Resource Management for Device-to-Device Underlay Communication Contents", Cornell University Library, Nov. 5, 2013 (Nov. 5, 2013), pp. 1-84, XP055243452.
European Office Action dated Jan. 30, 2020 issued in European Application No. 15789649.9.
U.S. Appl. No. 61/898,425, filed Oct. 31, 2013 (Year: 2013).
"3rd Generation Partnership Project; Technical Specification Group Radio Access Network; Evolved Universal Terrestrial Radio Access (EUTRA); Physical layer procedures (Release 12)", Mar. 19, 2014, pp. 1-186, XP050770002.
European Office Action dated Jul. 16, 2019, issued in European Patent Application No. 15789649.9-1219.
Chinese Office Action dated Jun. 25, 2019, issued in Chinese Patent Application No. 201580037338.7.
Indian Office Action dated May 13, 2020, issued in Indian Application No. 201637037550.

* cited by examiner

METHOD AND APPARATUS FOR PERFORMING COMMUNICATION BY D2D COMMUNICATION TERMINAL

CROSS-REFERENCE TO RELATED APPLICATION(S)

This application is a continuation application of prior application Ser. No. 15/819,517, filed on Nov. 21, 2017, which is a continuation of prior application Ser. No. 14/707,548, filed on May 8, 2015, which has issued as U.S. Pat. No. 9,847,848 on Dec. 19, 2017, and was based on and claimed the benefit under 35 U.S.C. § 119(a) of a Korean patent application filed on May 9, 2014 in the Korean Intellectual Property Office and assigned Serial number 10-2014-0055928, of a Korean patent application filed on Jun. 26, 2014 in the Korean Intellectual Property Office and assigned Serial number 10-2014-0079196, and of a Korean patent application filed on Sep. 25, 2014 in the Korean Intellectual Property Office and assigned Serial number 10-2014-0128338, the entire disclosure of each of which is hereby incorporated by reference.

TECHNICAL FIELD

The present disclosure relates to a communication method of a Device to Device (D2D) communication terminal. More particularly, the present disclosure relates to a method and an apparatus for controlling transmission power of a D2D communication terminal, and a method and an apparatus for maintaining or controlling a communication range or coverage of a D2D communication terminal. Further, the present disclosure relates to a D2D power control technology for solving an In-Band Emission (IBE), Inter-Carrier Interference (ICI), or Inter-Symbol Interference (ISI) problem caused by a D2D terminal in a cellular system.

BACKGROUND

To meet the demand for wireless data traffic that has increased since deployment of 4th Generation (4G) communication systems, efforts have been made to develop an improved 5th Generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands (e.g., 60 GHz bands), so as to achieve higher data transmission rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency Shift Keying (FSK) and Quadrature Amplitude Modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth are currently being researched. Such an IoT environment may provide intelligent Internet technology services that create a new value to human life by collecting and analyzing data generated among connected things. IoT may be applied to a variety of fields including a smart home, a smart building, a smart city, a smart car or connected cars, a smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud RAN as the above-described Big Data processing technology may also be considered to be as an example of convergence between the 5G technology and the IoT technology.

Currently, due to the supply of smart phones, data traffic has rapidly increased. In the future, the number of users of smart phones will further increase and the increase in the number of users is expected to further increase data traffic above current levels since application services such as Social Network Services (SNS) and games using the smart phones will be activated more frequently. Particularly, when M2M communication, such as communication between a person and a machine and communication between machines that correspond to a new mobile market beyond communication between people is activated, traffic transmitted to an evolved NodeB (eNB) is expected to increase beyond that which may be handled.

Accordingly, technologies to solve the above problems are needed, and a direct communication between devices is recently spotlighted as the technology. The technology called D2D communication is spotlighted in both a licensed band of mobile communication and an unlicensed band such as Wireless Local Area Network (WLAN).

An LTE-based D2D communication technology may be classified into a D2D discovery and D2D communication. The D2D discovery refers to a series of processes in which one User Equipment (UE) identifies identities or interests of other UEs existing on proximity to the UE or informs other UEs located near the UE of the UE's own identity or interest. At this time, an identity and interest may include an identifier (ID) of the UE, an application ID, or a service ID, and may be variously configured according to a D2D service and operation scenario.

It is assumed that a hierarchical structure of the UE includes a D2D application layer, a D2D management layer, and a D2D transport layer. The D2D application layer may refer to a D2D service application program driven by a UE Operating System (OS), the D2D management layer may perform a function of converting discovery information generated by a D2D application program into a format suitable for a transport layer, and the transport layer may refer to a Physical layer (PHY)/Medium Access Control (MAC) layer of an LTE or Wi-Fi wireless communication standard. At this time, the D2D discovery may be performed by the following process. When a user executes a D2D application program, information for discovery is generated by the application layer and the generated information is transmitted to the D2D management layer. The management layer converts the discovery information received from the application layer into a management layer message. The management layer message is transmitted through the transport layer of the UE, and UEs receiving the management layer message perform a reception operation in a reverse order of the transmission process.

The D2D communication corresponds to a communication method in which UEs directly transmit traffic therebetween without passing through infrastructure such as an eNB or Access Point (AP). At this time, the D2D communication may be performed based on a D2D discovery process after the D2D discovery process is performed, or may be performed without the D2D discovery process. The D2D discovery process before the D2D communication may or may not be necessary according to a D2D service and operation scenario.

The D2D service scenario may be largely classified into a commercial service (or a non-public safety service) and a public safety service. Each of the services may include innumerable use examples, but representatively include, for example, an advertisement, an SNS, a game, and a public safety service.

1) Advertisement: a communication network operator that supports D2D may allow pre-registered stores, cafes, theaters, restaurants, and the like to advertise identities thereof to D2D users located within a short distance by using D2D discovery or D2D communication. At this time, the interest may be a promotion of advertisers, event information, or discount coupons. When the corresponding identity matches the interest, the user may visit a corresponding store and acquire much more information by using an existing cellular communication network or D2D communication. In another example, an individual user may discover a taxi located nearby the UE through a D2D discovery and exchange data on a destination or fare information of the UE through existing cellular communication or D2D communication.

2) SNS: the user may transmit an application of the user and interest in the corresponding application to other users located in a nearby area. At this time, the identity or interest used for the D2D discovery may be a friend list of the application or an application ID. The user may share contents such as pictures or videos possessed by the user with nearby users through D2D communication after the D2D discovery.

3) Game: the user may discover users and a game application through the D2D discovery process in order to play a mobile game with users located nearby and perform D2D communication to transmit data required for the game.

4) Public safety service: policemen or firefighters may use the D2D communication technology for the purpose of public safety. That is, when an existing cellular network is partially damaged due to an emergency situation such as a fire or a landslide or a natural disaster such as an earthquake, an eruption or a volcano, or a tsunami and thus cellular communication is not possible, policemen or firefighters may find adjacent companions through the D2D communication technology or share their own emergency information with adjacent users.

A $3^{rd}$ Generation Partnership Project (3GPP) LTE D2D standardization which is currently discussed is progressed for both the D2D discovery and the D2D communication, but there is a difference in standardization ranges. The D2D discovery is performed for the commercial purpose, and should be designed to operate only in network coverage. That is, the D2D discovery is not supported in a condition where the eNB does not exist (or beyond the coverage of the eNB). The D2D communication is performed for the purpose of a public safety service rather than the commercial purpose, and should be supported in all of conditions such as in-network coverage, out-of-network coverage, and partial network coverage (communication under a condition where some UEs exist in the network coverage and some UEs exist out of the network coverage). Accordingly, in the public safety service, the D2D communication should be performed without the support of the D2D discovery.

In the currently discussed LTE D2D standardization, both the D2D discovery and the D2D communication are performed in an LTE uplink subframe. That is, a D2D transmitter transmits a D2D discovery signal and data for D2D communication in the uplink subframe and a D2D receiver receives the D2D discovery signal and the data in the uplink subframe. Currently in the LTE system, since the UE receives data and control information from the eNB through downlink and transmits data and control information to the eNB through uplink, operations of the D2D transmitter/receiver may be different from those in LTE. For example, the UE which does not support a D2D function has an Orthogonal Frequency Division Multiplexing (OFDM)-based receiver to receive downlink data and control information from the eNB, and requires a Single Carrier-FDM (SC-FDM)-based transmitter to transmit uplink data and control information to the eNB. However, since the D2D UE is required to support both a cellular mode and a D2D mode, the D2D UE should also have a separate SC-FDM receiver to receive D2D data and control information through uplink as well as the OFDM-based receiver for receiving downlink data from the eNB and the SC-FDM-based transmitter for transmitting data or control information, or D2D data and control information to the eNB through downlink. Currently, two types of D2D discovery methods are defined according to a resource allocation method.

1) Type 1 discovery: the eNB broadcasts an uplink resource pool which may be used for the D2D discovery to all D2D UEs within a cell managed by the eNB via a System Information Block (SIB). At this time, the size of resources which may be used for D2D (for example, x consecutive subframes) and a period of resources (for example, repetition every y seconds) may be informed. D2D transmission UEs having received the uplink resource pool distributively select resources used by themselves and transmit D2D discovery signals. There may be a variety of methods to distributively select the resources by the D2D transmission UEs. For example, a simplest method may be random resource selection. That is, the D2D transmission UE which desires to transmit a D2D discovery signal randomly selects resources to be used directly by the D2D transmission UE within a type 1 discovery resource area acquired through the SIB. Another resource selection method may be a method of selecting resources by the UE based on energy sensing. That is, the D2D transmission UE which desires to transmit a D2D discovery signal senses every level of all Resource Blocks (RBs) existing within the type 1 discovery resource area acquired through the SIB during a predetermined interval, selects an RB having a lowest energy level or an RB having an energy level equal to or smaller than a particular threshold, or sort RBs having energy levels equal to or smaller than a particular threshold and then randomly select resources among the sorted RBs. The D2D transmission UE having selected resources transmits the discovery signal to the selected RBs in the next type 1 discovery resource area after the energy sensing interval. The D2D reception UEs should receive (decode) all D2D discovery signals in the resource pool included in SIB information. For example, the D2D reception UEs, which recognize that x consecutive subframes repeat every y seconds through the SIB decoding, perform the decoding on all RBs allocated for the D2D discovery within the x consecutive subframes. In the type 1 discovery, all D2D UEs in a cellular Radio Resource Control (RRC)-Idle mode and an RRC_Connected mode may transmit/receive discovery signals.

2) Type 2 discovery: the eNB informs of a discovery signal resource pool which the D2D reception UEs should receive through the SIB. Discovery signal transmission resources for the D2D transmission UEs are scheduled by the eNB (that is, the eNB instructs the D2D transmission UEs to perform transmission in a particular time-frequency resource). At this time, the scheduling of the eNB may be performed through a semi-persistent scheme or a dynamic scheme, and the D2D transmission UE should make a request for allocating D2D transmission resources such as a Scheduling Request (SR) or a Buffer Status Report (BSR) for such an operation to the eNB. Accordingly, in the type 2 discovery, all D2D UEs should be in the RRC-Connected mode. That is, the D2D transmission UEs in the RRC-Idle mode should switch to the RRC_Connected mode through a random access process in order to make the request for allocating D2D transmission resources. Allocation information of the D2D transmission resources of the eNB may be transmitted to each of the D2D transmission UEs through RRC signaling or through an (enhanced) Physical Downlink Control CHannel ((e)PDSCH).

A D2D communication method may be classified into two types according to resource allocation like the D2D discovery method.

1) Mode 1: the eNB or a Release 10 relay directly informs a D2D transmitter of resources to be used by the D2D transmitter to transmit data and control information for D2D communication. Further, by using the SIB, the eNB informs of a D2D signal resource pool which the D2D reception UE should receive.

2) Mode 2: based on resource pool information for transmission of the data and control information acquired by the D2D transmitter through the SIB or a separate control channel (Physical D2D Synchronization CHannel: PD2DSCH), the D2D transmitter solely distributively selects and transmits resources within the corresponding resource pool. At this time, a method of selecting resources by the D2D transmitter may include the random resource selection method or the energy-sensing based resource selection method as described in the type 1 discovery.

In a cellular system such as LTE, various interferences may occur when D2D communication is supported. Such various interferences may be caused by characteristics of the cellular system described below.

Transmit Power Control (TPC) in Cellular System

In a cellular system, in uplink transmission of the UE, the eNB reduces interference caused to another cell, increases a battery life of a cellular UE, and controls UE transmission power to receive data and control information from each UE with proper power. In order to control uplink transmission power of UEs, the eNB may inform the UEs of various parameters required for controlling the transmission power or the UEs may predict some parameters by themselves to determine their own transmission power and configure transmission power. In order to determine the parameters, with assistance from the UE, the eNB may measure channel quality (received signal strength) between the eNB and the UE and channel quality (for example, interference signal strength) which may influence the eNB and the corresponding UE and reflect the measured channel quality to control the transmission power. For example, in the LTE system, transmission power $P_{PUSCH}(i)$ of a Physical Uplink Shared CHannel (PUSCH) corresponding to a physical channel for uplink data transmission in an $i^{th}$ subframe of the UE is defined as Equation 1 below.

$$P_{PUSCH}(i) = \min\left\{\begin{array}{l}P_{CMAX}(i)\\10\log_{10}(M_{PUSCH}(i)) + P_{0\_PUSCH}(j) +\\ \alpha(j) \cdot PL + \Delta_{TF}(i) = f(i)\end{array}\right\}[dBM] \quad \text{Equation 1}$$

Parameters for controlling power are defined below.

$P_{CMAX}(i)$: Maximum transmission power of the UE in an ith subframe $M_{PUSCH}(i)$: The number of RBs allocated by the eNB for PUSCH transmission in the $i^{th}$ subframe.

$P_{0\_PUSCH}(i)$: Parameter including $P_{O\_NOMINAL\_PUSCH}(j) + P_{O\_UE\_PUSCH}(j)$, (where j=0: semi-persistent grant, j=1:dynamic scheduling grant, j=2: random access response grant), and corresponds to a value of which the eNB informs the UE through higher layer signaling. When j=0 or j=1, $P_{O\_NOMINAL\_PUSCH}(j)$ is a cell-specific value of 8-bit information and has a range of [−126, 24] dB. Further, $P_{O\_UE\_PUSCH}(j)$ is a UE-specific value of 4-bit information and has a range of [−8, 7] dB. When j=2, $P_{O\_UE\_PUSCH}(j)$ is 0. The cell-specific value is transmitted by the eNB through the SIB and the UE-specific value is transmitted to the UE by the eNB through dedicated RRC signaling.

$\alpha(j)$: Value for compensating for a path-loss and a cell-specific value corresponding to one of {0, 0.4, 0.5, 0.6, 0.7, 0.8, 0.9, 1} informed by the eNB through 3-bit information when j=0 or j=1. When j=2, $\alpha(j)=1$ is used.

PL: downlink path-loss measured by the UE.

$\Delta_{TF}(i)$: Compensation value according to a Modulation Coding Scheme (MCS) to be used in the $i^{th}$ subframe f(i): accumulated power control or absolute power control function (whether to use the accumulated power control or the absolute power control function is determined through higher layer signaling). For example, according to whether accumulation-enabled is on or off, the accumulated power control or the absolute power control function is used.

Accumulated power control: $f(i)=f(i-1)+\delta_{PUSCH}(i-K_{PUSCH})$

Absolute power control: $f(i)=\delta_{PUSCH}(i-K_{PUSCH})$

The eNB informs the UE of $\delta_{PUSCH}$ through a Transmit Power control (TCP) command within Downlink Control Information (DCI) transmitted through a downlink control channel (Physical Downlink Control CHannel (PDCCH). At this time, $\delta_{PUSCH}$ is transmitted by DCI of the downlink PDCCH before a $K_{PUSCH}$ subframe and reflected in power control for uplink subframe transmission. $\delta_{PUSCH}$ may have values of −1, 0, 1, and 3 [dB] in DCI format 0, DCI format 3, and DCI format 4, and may be expressed in 2 bits. In DCI format 3A, $\delta_{PUSCH}$ may have values of −1 and 1 [dB], and may be expressed in 1 bit. $K_{PUSCH}$=4 in a Frequency Division Duplexing (FDD) system, and $K_{PUSCH}$ has various values according to a TDD DL/UL configuration in Time Division Duplexing (TDD) system.

As known from the above equation, the UE receives $P_{O\_NOMINAL\_PUSCH}(j)$ and $\alpha(j)$ which are cell-specific parameters, $P_{O\_UE\_PUSCH}(j)$ and $\Delta_{TF}(i)$ which are UE-specific parameters, and j from the eNB through higher layer signaling in the LTE system. Further, the UE may acquire values required for f(i) through a PDCCH corresponding to a downlink control channel.

Timing Advance (TA)

In the cellular communication according to the related art, the eNB performs TA to receive data and control information, which are transmitted from UEs located at different positions within the cell managed by the eNB through the uplink, at the same period of time. At this time, a TA value, which the eNB transmits to the UE, may vary depending on a Round Trip Delay (RTD) between the eNB and the UE. For example, since UEs located nearby the eNB have a small RTD, the eNB informs the corresponding UEs of a small TA value. On the contrary to this, since UEs located far away from the eNB have a large RTD, the eNB informs the corresponding UEs of a large TA value.

The UEs having received the TA values drive timers installed in the UEs, and follow a TA command received from the eNB before the timers thereof expire unless there is a separate command from the eNB. That is, before the timer expires, data and control information, which the UE transmits to the eNB through the uplink, are based on the corresponding TA value.

Cyclic Prefix (CP) Length

The LTE system supports two types of CP lengths (normal CP and extended CP). The CP lengths may be configured by operators according to cell coverage and cell channel environment. For example, when the cell coverage is small and channel delay spread is narrow, the normal CP may be used. In contrast, when the cell coverage is large and channel delay spread is wide, the extended CP may be used. In the LTE system, the downlink CP length is provided to the UE without special signaling, and each UE may blindly detect the downlink CP length during a Primary Synchronization Signal (PSS)/Secondary Synchronization Signal (SSS) detection process for downlink synchronization with the eNB. The uplink CP length is configured to all UEs within the cell through SIB2. That is, the LTE system assigns freedom to the system design in order to differently operate the uplink CP length and the downlink CP length.

In the cellular (LTE) system according to the related art, the UE receives data and control information from the eNB through the downlink and transmits data and control information to the eNB through the uplink. However, in an LTE-based D2D system, a D2D discovery signal and D2D communication are performed in an uplink subframe. That is, a D2D transmission UE transmits a D2D discovery signal and data/control information for D2D communication in an uplink subframe, and a D2D reception UE receives a D2D discovery signal and data/control information for D2D communication in an uplink subframe. With respect to resources for the D2D discovery signal and the D2D communication, a PUSCH for uplink data transmission of the cellular UE of the related art or an uplink feedback channel of the UE may be frequency-division multiplexed and used in the same subframe as that of a Physical Uplink Control CHannel (PUCCH).

When D2D resources and resources of the cellular UE of the related art are frequency-division multiplexed and used in the same subframe, if the D2D transmission UE uses maximum transmission power in order to increase the coverage (or range) of the D2D discovery signal and D2D communication, transmission signals (discovery signal and communication signal) of the D2D UE causes an in-band emission problem in the eNB, which receives the PUCCH or PUSCH transmitted from the cellular UE of the related art. That is, the eNB performs a power control to allow an eNB receiver to consistently receive the PUCCH (or PUSCH) transmitted by the cellular UE through the uplink without escaping from a dynamic range of an Automatic Gain Control (AGC) gain. At this time, when a power strength of a discovery signal or a D2D communication signal transmitted by the D2D transmission UE located nearby the eNB is great, the AGC gain of the eNB receiver is controlled and the cellular UE performs the power control. Accordingly, the PUCCH (or PUSCH) transmitted to the eNB through the uplink may escape from the dynamic range of the AGC of the eNB receiver and thus may not be received. Such a phenomenon may be called In-Band Emission (IBE).

Based on the Release-12 D2D standard, the PUSCH transmitting the D2D signal, which is transmitted by the D2D UE, and the PUCCH, which is transmitted by the cellular UE of the related art, may be frequency-division multiplexed and used in the same subframe. The PUCCH of the cellular UE of the related art is transmitted based on TA according to a command of the eNB. For example, the cellular UE located nearby the eNB may perform transmission with a small TA value, and the cellular UE far away from the eNB may perform transmission with a large TA value. However, in D2D type 1 discovery or D2D mode 2 communication, the D2D signal is transmitted based on a downlink transmission reference time, not based on an uplink transmission reference time (based on TA) to support the RRC_Idle mode UE. That is, in the RRC_Idle mode, uplink synchronization is not maintained, and only random access performed to move to RRC_CONNECTED is possible in uplink transmission. Accordingly, the D2D signal is transmitted based on the downlink time after the downlink PSS/SSS, which is not transmitted through the uplink, is received from the eNB and downlink synchronization is performed. In this case, since the PUCCH is transmitted according to the uplink reference time based on TA, and the D2D PUSCH is transmitted according to the downlink reference time, if the PUCCH and the D2D PUSCH are frequency-division multiplexed and used in the same subframe, the D2D PUSCH may cause an Inter-Carrier Interference (ICI) problem in reception of the PUCCH of the eNB.

If the D2D PUSCH and the cellular PUSCH of the related art are time-division multiplexed and used, the D2D PUSCH may give an Inter-Symbol Interference (ISI) problem to the cellular PUSCH. For example, when it is assumed that the D2D PUSCH is transmitted in an nth subframe according to the downlink reference time and the cellular PUSCH is transmitted in an n+1th subframe according to the uplink reference time, if the DD PUSCH receives the PSS/SSS with a T1 propagation delay, the D2D PUSCH in the nth subframe is received by the eNB while having a 2*T1 propagation delay since the D2D PUSCH is transmitted according to the downlink reference time. When the propagation delay is longer than a CP length of the n+1th subframe, the D2D PUSCH may cause interference in the cellular PUSCH and thus the eNB may not smoothly receive the cellular PUSCH.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for solving various interference problems occurring when a cellular system supports Device to Device (D2D) discovery or D2D communication.

Another aspect of the present disclosure is to provide a method and an apparatus for controlling transmission power of a D2D User Equipment (UE) to solve an In-Band Emission (IBE), Inter-Carrier Interference (ICI), or Inter-Symbol Interference (ISI) problem occurring in the cellular system by the D2D UE.

Another aspect of the present disclosure is to provide a method and an apparatus for repetition or repetitive transmission for maintaining a communication range of a D2D UE or preventing the communication range from being reduced.

In accordance with an aspect of the present disclosure, a method of controlling transmission power of a terminal performing D2D communication in a wireless communication system is provided. The method includes receiving power control information corresponding to radio resources used for the D2D communication by the terminal from a base station, determining a first transmission power of the radio resources to be used for the D2D communication by the terminal among the radio resources, and transmitting data for the D2D communication with the determined first transmission power by using the radio resource to be used for the D2D communication by the terminal.

In accordance with another aspect of the present disclosure, a method of controlling transmission power of a terminal by a base station supporting D2D communication in a wireless communication system is provided. The method includes determining radio resources used for the D2D communication, generating power control information corresponding to the radio resources used for the D2D communication, and transmitting the determined power control information to the terminal.

In accordance with another aspect of the present disclosure, a method of controlling transmission power of a terminal performing D2D communication in a wireless communication system is provided. The method includes receiving information on repetitive transmission of D2D communication data from a base station, determining preset radio resources to be used for the D2D communication by the terminal, and transmitting data for the D2D communication according to the information on the repetitive transmission by using the determined preset radio resources.

In accordance with another aspect of the present disclosure, a method of controlling transmission power of a terminal by a base station supporting D2D communication in a wireless communication system is provided. The method includes generating information on repetitive transmission to be used for the D2D communication by the terminal and transmitting the information of the repetitive transmission to the terminal.

In accordance with another aspect of the present disclosure, a terminal for performing D2D communication in a wireless communication system is provided. The terminal includes a transceiver configured to transmit and receive a signal and a controller configured to receive power control information corresponding to radio resources used for the D2D communication by the terminal from a base station, to determine a first transmission power of the radio resources to be used for the D2D communication by the terminal among the radio resources, and to transmit data for the D2D communication with the determined first transmission power by using the radio resource to be used for the D2D communication by the terminal.

In accordance with another aspect of the present disclosure, a base station for supporting D2D communication in a wireless communication system is provided. The base station includes a transceiver configured to transmit and receive a signal and a controller configured to determine radio resources used for the D2D communication, to generate power control information corresponding to the radio resources used for the D2D communication, and to transmit the determined power control information to the terminal.

In accordance with another aspect of the present disclosure, a terminal for performing D2D communication in a wireless communication system is provided. The terminal includes a transceiver configured to transmit and receive a signal and a controller configured to receive information on repetitive transmission of D2D communication data from a base station, to determine preset radio resources to be used for the D2D communication by the terminal, and to transmit data for the D2D communication according to the information on the repetitive transmission by using the determined preset radio resources.

In accordance with another aspect of the present disclosure, a base station for supporting D2D communication in a wireless communication system is provided. The base station includes a transceiver configured to transmit and receive a signal and a controller configured to generate information on repetitive transmission to be used for the D2D communication by the terminal, and to transmit the information of the repetitive transmission to the terminal.

According to various embodiments of the present disclosure, it is possible to introduce D2D in an LTE system and also mitigate or avoid IBE, ICI, and ISI caused in existing cellular UEs by D2D UEs.

According to various embodiments of the present disclosure, there are effects of protecting existing cellular UEs and also creating a new service by performing discovery or D2D communication.

According to an embodiment of the present disclosure, it is possible to mitigate IBE, ICI, and ISI caused in existing cellular UEs by D2D UEs by controlling transmission power and also minimize a change and reduction in a communication range of the D2D UE by performing repetition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
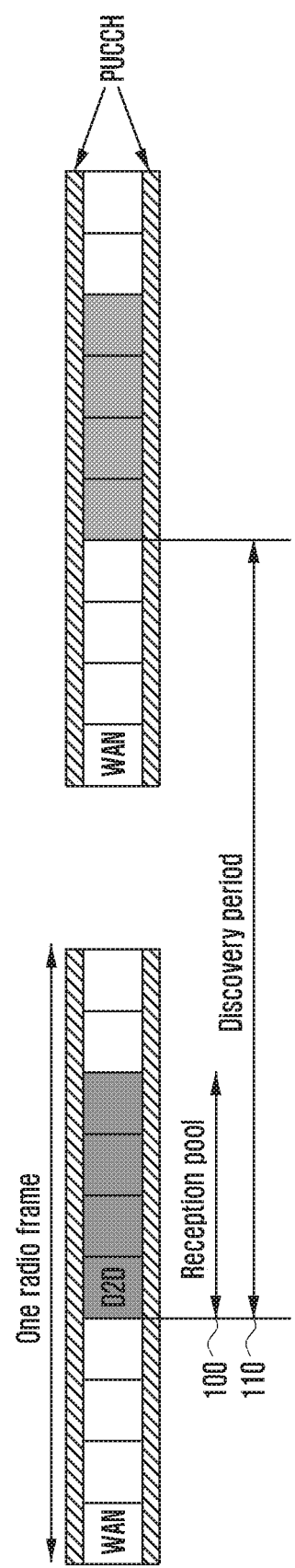
FIG. 1 illustrates an example of resource allocation for type 1/type 2B or mode 2 communication in a Long Term Evolution (LTE) Device to Device (D2D) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure may be applied to control transmission power of a User Equipment (UE) in Device to Device (D2D) communication, but is not limited thereto. Further, the present disclosure may be modified and applied without departing from the scope of the present disclosure to control power of a signal transmitted by the UE when radio resources are allocated in wireless communication and the communication is performed by the allocated radio resources.

The present disclosure may be implemented through a D2D UE. In various embodiments of the present disclosure, a UE may operate as a transmission UE for allocating and broadcasting resources. Whether the UE operates as a transmission UE or a reception UE may be determined by an evolved NodeB (eNB) or according to a predetermined rule. In the following description, the transmission UE and the reception UE may be interchangeably used with some UEs and the remaining UEs, a UE and another UE, or a first group UE and a second group UE.

According to the present disclosure, D2D communication is performed in the unit of frames as the basic unit. The frame may be referred to as a repetitive interval, a repetitive period, or a D2D frame. The frame may be used equally to a frame defined in Long Term Evolution (LTE), but a structure and format thereof may be the same as or different from those of the frame defined in LTE. A frequency axis of the frame may include a plurality of Resource Blocks (RBs).

The eNB may control and support a resource allocation method by the UE according to the present disclosure. In this specification, although the description will be made mainly based on out-of-network coverage in which the UE is not controlled by the eNB, the present disclosure may be modified and applied to an acceptable range such as in-network coverage or partial network coverage in which the eNB and the UE perform communication with each other. According to various embodiments of the present disclosure, the eNB may be replaced with a UE serving as a coordinator in an environment where there is no eNB.

An embodiment of the present disclosure will be described in detail with reference to the accompanying drawings.

FIG. 1 illustrates an example of resource allocation for type 1/type 2B or mode 2 communication in an LTE D2D system according to an embodiment of the present disclosure.

FIG. 1 illustrates an example of a Frequency Division Duplexing (FDD) system, but the present disclosure is not limited to the FDD system. In the FDD system, a DownLink (DL) and an UpLink (UL) use different frequency bands. Resource allocation information on radio resources which the D2D UE may use and may be transmitted through a System Information Block (SIB). At this time, the SIB may include resource allocation information for type 1 discovery, type 2B discovery, mode 1 communication, or mode 2 communication. Particularly, the type 1 discovery and the type 2B discovery may use the same reception resource pool 100. In other words, a D2D reception UE receives all discovery signals transmitted in the reception resource pool configured by the SIB without distinguishing between the resource pool for receiving the type 1 discovery and the resource pool for receiving the type 2B discovery. A type 2B discovery transmission UE informs all D2D UEs within a cell of transmission resource pool information for transmitting a type 2B discovery message through the SIB. At this time, the SIB may include a number of subframes, a number of RBs occupying subframes included in the resource pool, and a discovery period 110 indicated by the D2D resource pool.

D2D UEs synchronize downlink with a cellular system through synchronization signals and receive information on the cell which the D2D UEs access by using a Master Information Block (MIB) transmitted to a Physical Broadcast CHannel (PBCH). For example, the MIB includes necessary parameter information such as a DL system bandwidth, a system frame number, and a Physical hybrid-Automatic Repeat-reQuest (ARQ) Indication CHannel (PHICH). The UEs having received the MIB may receive a Physical Downlink Control CHannel (PDCCH) transmitted from the eNB in every subframe. Basically, the PDCCH transmits DL and/or UL resource allocation information. Each UE decodes allocation information of SIB resources existing in the PDCCH by using a system Information (SI)-Radio Network Temporary Identifier (RNTI) or a D2D-RNTI. That is, the UE may be informed of information on a frequency-time domain where the SIB is located through the decoding of the PDCCH using the SI-RNTI (or D2D-RNTI) and decodes the SIB through the decoding of the corresponding frequency-time domain. The UEs having successfully decoded the SIB may acquire discovery subframe information included in the SIB, so that the UE may recognize a sequence(s) of a subframe(s) used for the discovery or the number of consecutive subframes used for the discovery and information on a period of the discovery subframes. When a position of the discovery subframe changes within the corresponding frame (e.g., the position of the discovery subframe changes from no. 3 to no. 5 or the number of discovery subframes increases due to a change in the number from one to two), the eNB may inform the UE of the change through the SIB or through a paging channel. The UE transmitting D2D discovery information may directly select discovery resources to be transmitted in the corresponding subframe(s) (type 1) or the eNB may select discovery resources and inform the UE of the selected discovery resources (type 2B).

Figure 2:
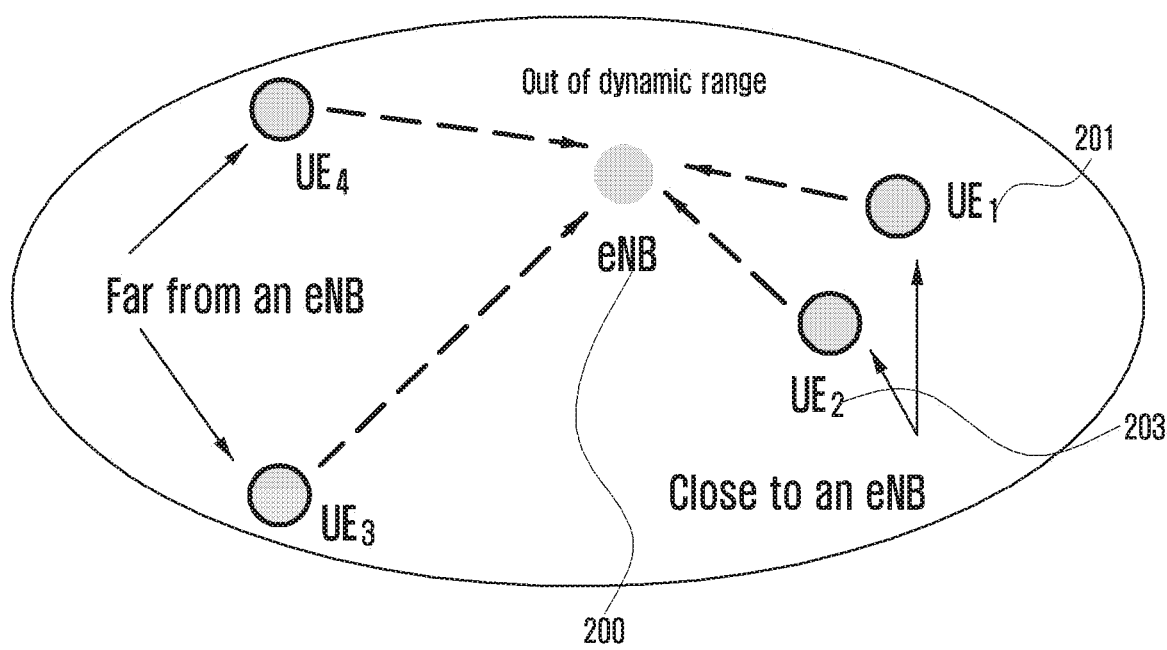
FIG. 2 illustrates an In-Band Emission (IBE) problem occurring when a cellular Physical Uplink Control CHannel (PUCCH) and a D2D Physical Uplink Shared CHannel (PUSCH) separately use resources through Frequency Division Multiplexing (FDM) according to an embodiment of the present disclosure.

FIG. 2 illustrates an In-Band Emission (IBE) problem occurring when a cellular Physical Uplink Control CHannel (PUCCH) and a D2D Physical Uplink Shared CHannel (PUSCH) separately use resources through Frequency Division Multiplexing (FDM).

Referring to FIG. 2, in PUSCH transmission, the D2D transmission UE performs the transmission with maximum transmission power to guarantee a discovery or communication range. Accordingly, D2D signals transmitted by UE #1 201 and UE #2 203 located nearby an eNB 200 may be received by the eNB 200 with high power. A PUCCH signal transmitted by a cellular UE is power-controlled to maintain a constant reception power value received by the eNB 200.

At this time, when there is a level difference between reception signals received by the eNB 200, it may be difficult to control an Automatic Gain Control (AGC) gain of a receiver. Specifically, when the AGC gain is adjusted to the signal received with low power, the signal received with high power has clipping, is distorted, and orthogonality thereof is destroyed. In contrast, when the AGC gain is adjusted to the signal received with high power, the signal received with low power cannot be received. Accordingly, although frequency resources orthogonal to each other are used, interference is generated due to adjacent frequency resources between signals beyond a dynamic range of the AGC gain, which is called IBE.

Figure 3A:
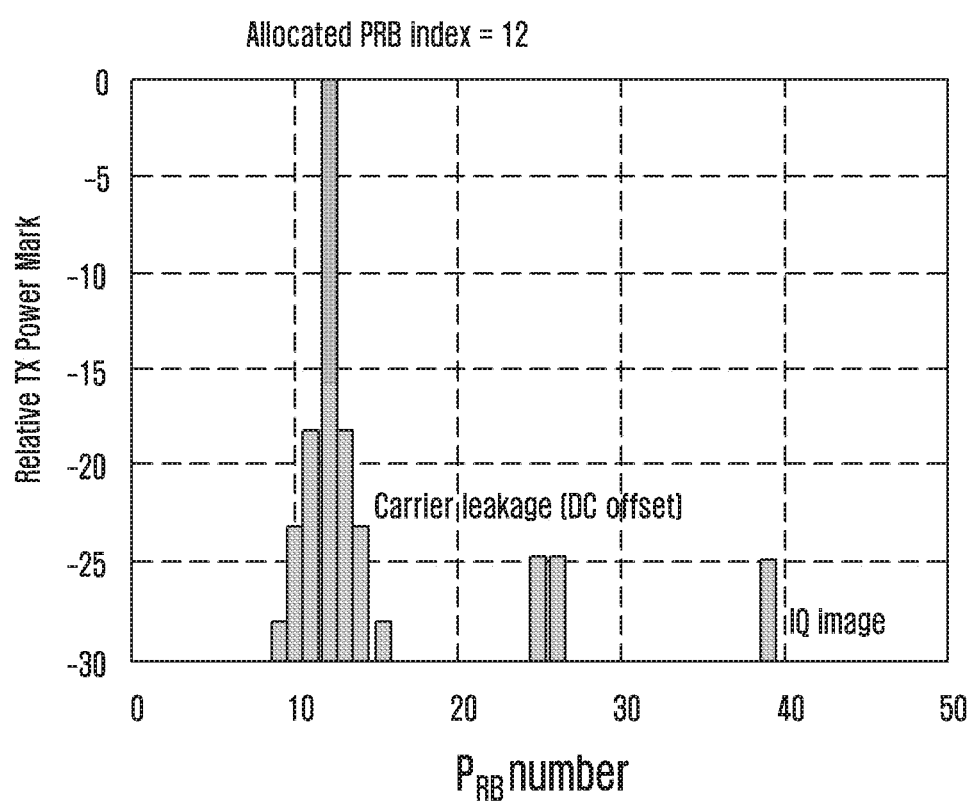
FIGS. 3A and 3B illustrate an IBE problem according to various embodiments of the present disclosure.
Figure 3B:
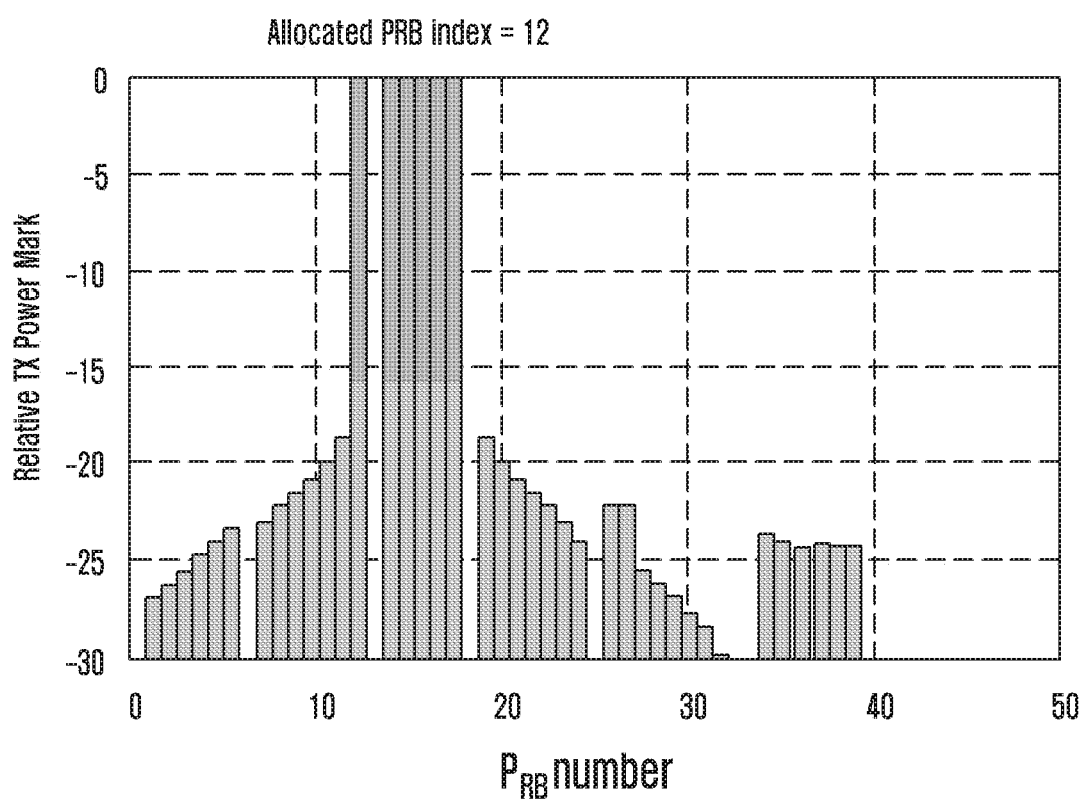

FIGS. 3A and 3B illustrate an IBE phenomenon. FIG. 3A illustrates an IBE phenomenon in which, when a particular UE uses one RB (12th RB), stepped interference is generated in adjacent RBs according to an embodiment of the present disclosure, and FIG. 3B illustrates an IBE phenomenon in which, when a particular D2D UE uses six RBs ($12^{th}$, $13^{th}$, $14^{th}$, $15^{th}$, $16^{th}$, and $17^{th}$ RBs), stepped interference is generated in adjacent RBs according to an embodiment of the present disclosure.

Referring to FIGS. 3A and 3B, through a comparison between FIGS. 3A and 3B, it may be noted that a stronger IBE phenomenon happens in adjacent RBs as the number of allocated RBs is greater.

As a method to solve the IBE problem, the present disclosure proposes a method of controlling power of the D2D transmission UE. However, the power control of the D2D transmission UE may be different from the downlink power control performed in the existing cellular system. In a cellular system, in uplink transmission of the UE, the eNB generally reduces interference caused to another cell, increases a battery life of a cellular UE, and controls UE transmission power to receive data and control information from each UE with proper power. In order to control uplink transmission power of UE, the eNB may inform the UE of various parameters required for controlling the transmission power or the UE may solely predict some parameters to determine the UE's own transmission power and configure transmission power. In order to determine the parameters, with assistance from the UE, the eNB may measure channel quality (received signal strength) between the eNB and the UE and channel quality (e.g., interference signal strength) which may influence the eNB and the corresponding UE and reflect the measured channel quality to control the transmission power.

When the basic concept of the transmission power control in the cellular system is applied to the transmission power control of the D2D UE, channel information (received signal strength and interference signal strength) should be collected from adjacent channels and the collected channel information should be used to control the transmission power of the D2D UE. In uplink of the cellular system, since a receiving end is a fixed, that is, stationary eNB, average noise and interference received from adjacent cells may be measured in the long term. However, in the D2D system, since a receiving end is a mobile UE, it is difficult to measure average noise and interference received from adjacent UEs in the long term. Accordingly, direct application of the power transmission control in the general cellular system to the D2D system is not easy. Further, the D2D system also has other problems described below. Basically, channel quality between a transmitting end and a receiving end and information on average noise and interference which the receiving end experiences are required to control transmission power. However, in order to control transmission power of the D2D UE, interference which the corresponding D2D transmission UE causes in the cellular eNB, interference which the cellular UE causes in the corresponding D2D reception UE, and interference which the corresponding D2D transmission UE causes in another D2D reception UE should be measured. Accordingly, since the number of channels which should be measured is great, amounts of information which should be exchanged to measure all channel qualities are too great and thus overhead is great. Such a phenomenon may be more serious in a D2D discovery or D2D data multicast/broadcast scenario in which a single transmitter and multi receivers transmit/receive data.

Further, although it is assumed that all the channel qualities described above may be measured, due to a rapid change in mobility of the D2D UE and UE pairs for D2D communication (D2D configuration change), the measured channel qualities may be different at the time when the measured channel qualities are reflected. Accordingly, the system capability may deteriorate and, accordingly, the present disclosure proposes a transmission power control method considering a D2D system that solves such problems.

Figure 4:
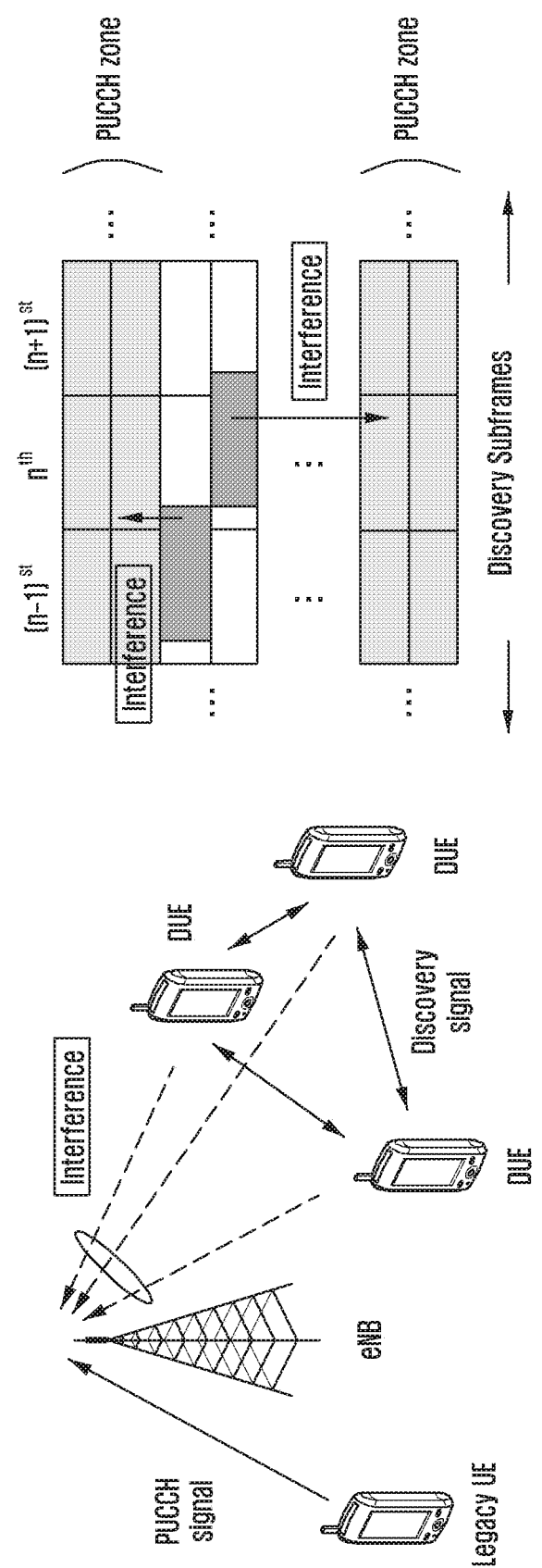
FIG. 4 is a view describing an Inter-Carrier Interference (ICI) problem according to an embodiment of the present disclosure.

FIG. 4 is a view describing an Inter-Carrier Interference (ICI) problem according to an embodiment of the present disclosure.

Referring to FIG. 4, the PUCCH is transmitted based on a Timing Advance (TA)-based uplink time, but the PUSCH transmitted by the D2D UE is transmitted based on a downlink reference time to support a UE in the Radio Resource Control (RRC)-Idle mode. When such different reference times are used, the D2D PUSCH may cause the ICI problem in a receiving end of the eNB that receives the cellular PUCCH.

More specifically, the ICI problem is generated because a D2D PUSCH signal which has experienced a propagation delay and channel delay spread and goes beyond a Cyclic Prefix (CP) length of the PUCCH is received by the eNB. At this time, if the D2D PUSCH signal which goes beyond the CP length of the PUCCH is received with small enough power by the eNB, reception of the PUCCH from the cellular UE is not influenced by the D2D PUSCH even though the D2D PUSCH which goes beyond the CP length of the PUCCH is received by the eNB. Accordingly, the present disclosure proposes a method and an apparatus for controlling transmission power of the D2D PUSCH to solve the ICI problem.

Particularly, the PUSCH of the D2D UE and the PUCCH of the cellular UE may use different length CPs for a flexible operation. When different CP lengths are used within the same subframe (e.g., the PUCCH uses a normal CP and the D2D PUSCH uses an extended CP), the PUSCH of the D2D UE causes a more serious ICI problem in the PUCCH of the cellular UE which is received by the eNB compared to a case where the PUCCH of the cellular UE and the PUSCH of the D2D UE use the same CP length. The present disclosure solves the ICI problem by controlling transmission power of the D2D PUSCH.

Figure 5:
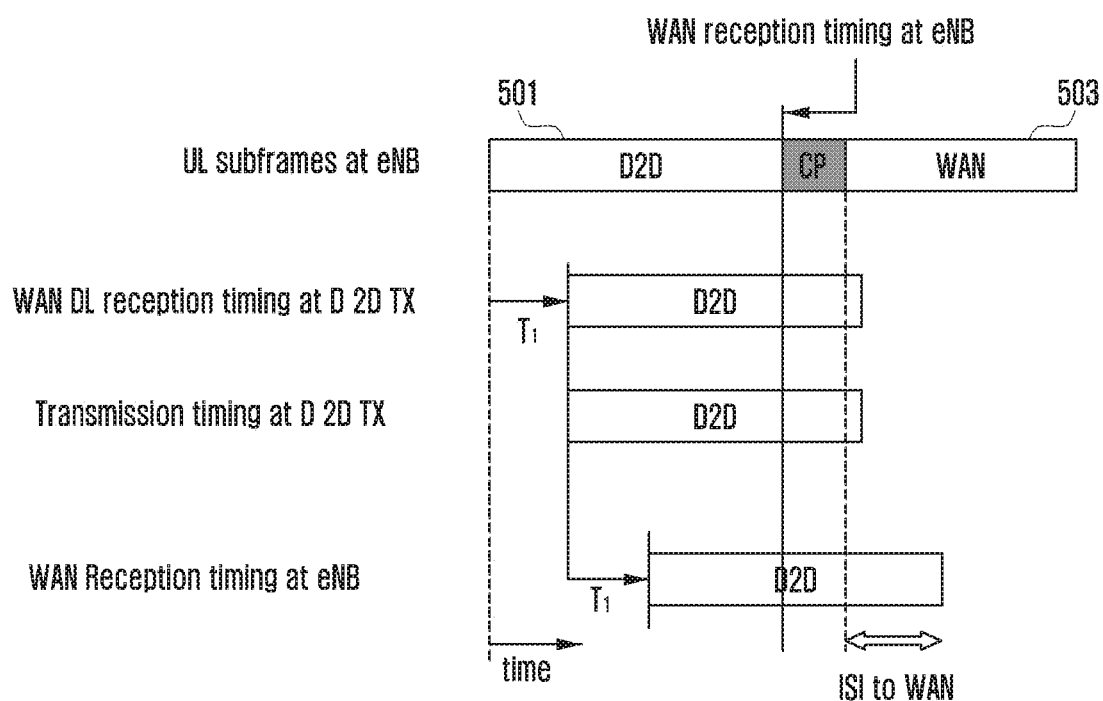
FIG. 5 is a view describing an Inter-Symbol Interference (ISI) problem according to an embodiment of the present disclosure.

FIG. 5 is a view describing an ISI problem according to an embodiment of the present disclosure.

Referring to FIG. 5, when a D2D subframe 501 (type 1 subframe) for transmitting a D2D signal based on a downlink reference time is ahead of a cellular subframe (or a D2D subframe 503 (type 2B subframe) transmitted based on an uplink reference time), the D2D subframe 501 may cause the Inter-Symbol Interference (ISI) problem in the cellular subframe 503 received by the eNB.

More specifically, when an eNB Primary Synchronization Signal (PSS)/Secondary Synchronization Signal (SSS) is received by a D2D Transmitter (TX) after a propagation delay of T1, the D2D TX performs transmission based on the corresponding downlink time. At this time, the D2D subframe transmitted by the D2D TX is received by an eNB receiver after another propagation delay of T1. Accordingly, when the propagation delay of double T1 goes beyond a CP length of a Wide Area Network (WAN) (cellular) subframe in the D2D subframe, the ISI problem is caused. That is, the ISI problem caused when the PUSCH of the D2D UE and the PUSCH of the cellular UE are used through Time Division Multiplexing (TDM) is generated when an nth transmitted PUSCH of the D2D UE goes beyond a CP length of an n+1th transmitted PUSCH of the cellular UE after a propagation delay and channel delay spread. Accordingly, similar to the ICI problem caused when the PUSCH of the D2D UE and the PUCCH of the cellular UE (or PUSCH of the cellular UE) are frequency-division multiplexed and used, the ISI problem may not occur when a received signal strength of the PUSCH of the D2D UE, which goes beyond the CP of the PUSCH of the cellular UE and is received by the eNB, is small. Therefore, the present disclosure solves the ISI problem by controlling transmission power of the PUSCH of the D2D UE.

Figure 6:
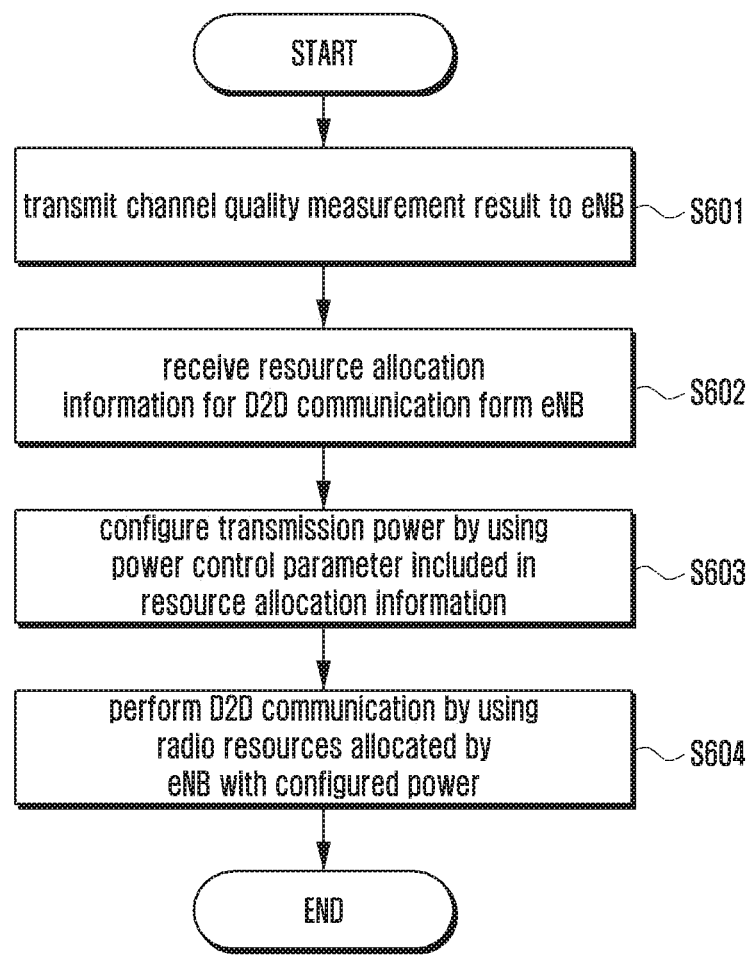
FIG. 6 is a flowchart illustrating a method of controlling transmission power of a D2D User Equipment (UE) according to an embodiment of the present disclosure.

FIG. 6 is a flowchart illustrating a method of controlling transmission power of the D2D UE according to an embodiment of the present disclosure.

Referring to FIG. 6, the D2D transmission power control method proposed by the present disclosure will be generally described in detail. The present disclosure proposes a method of controlling D2D transmission power to solve the IBE, ICI, or ISI problem. The present disclosure relates to a method of controlling power to solve the IBE and ICI problems which the PUSCH of the D2D UE causes in reception of the PUCCH/PUSCH signal of the eNB when the PUSCH of the D2D UE and the PUCCH/PUSCH of the cellular UE are frequency-division multiplexed and used. Further, the present disclosure relates to a method of controlling power to solve the ISI problem which the PUSCH of the D2D UE causes in reception of the cellular PUSCH signal of the eNB when the PUSCH of the D2D UE and the cellular PUSCH corresponding to a data channel of the existing cellular UE are used through TDM. More specifically, the present disclosure relates to a method of controlling D2D transmission power to solve the IBE problem generated when cellular uplink resources (cellular PUSCH or cellular PUCCH) and D2D resources (D2D PUSCH) that control transmission power are frequency division-multiplexed. Further, the present disclosure relates to a method of controlling D2D transmission power to solve the ICI problem generated when the cellular PUSCH, cellular PUCCH, or D2D discovery and D2D communication resources that are transmitted based on an UL transmit reference timing (TA) and D2D discovery and D2D communication resources that are transmitted based on a DL transmit reference timing are frequency division-multiplexed. In addition, the present disclosure relates to a method of controlling D2D transmission power to solve the ISI problem generated when and D2D discovery and D2D communication resources that are transmitted based on a DL transmit reference timing and the cellular PUSCH or D2D discovery and D2D communication resources that are transmitted based on a UL transmit reference timing (TA) are time division-multiplexed.

The D2D transmission power control method according to the present disclosure corresponds to a method which may be applied to all of types 1 and 2 and modes 1 and 2 in the discovery and communication of the D2D communication described above, but a transmission power control method for type 2 discovery and mode 1 communication will be first described and then a transmission power control method for type 1 discovery and mode 2 communication will be described hereinafter.

In type 2 discovery and mode 1 communication, the eNB allocates time-frequency resources to be used for transmitting D2D discovery and D2D communication to the D2D transmission UE. Accordingly, in type 2 discovery and mode 1 communication, the D2D transmission UE should be in the RRC-Connected mode, and D2D UEs in the RRC-Connected mode may receive cellular transmission power control parameters defined in Equation 1 above from the eNB.

According to the present disclosure, when the PUSCH of the D2D UE for transmitting type 2 discovery and mode 1 communication is frequency division-multiplexed with the PUCCH of the cellular UE, the eNB may perform the power transmission control in association with resource allocation to solve the IBE and ICI problems which the PUSCH of the D2D UE causes in the reception of the PUCCH of the cellular UE. The UE in the RRC_Connected mode measures downlink channel quality by using Cell-specific Reference Signals (CRSs) periodically transmitted from the eNB and reports the measured downlink channel quality (Channel Quality Indicator (CQI)). Further, the eNB may measure uplink channel quality by using Sounding Reference Signals (SRSs), which are periodically transmitted by the UE in the RRC_Connected mode or aperiodically transmitted according to a command of the eNB. Similarly, when the D2D transmission UE is in the RRC_Connected mode, the UE may measure and report downlink channel quality or may transmit the SRS to allow the eNB to measure uplink channel quality.

The UE may measure downlink channel quality and report the measured downlink channel quality to the eNB, or may transmit the SRS to allow the eNB to measure uplink channel quality in operation S601.

Based on the channel quality result, the eNB may allocate resources to D2D transmission UEs. At this time, the eNB may control D2D transmission power according to PUSCH transmission power of the cellular UE, so as not to cause the IBE and ICI problems in the PUCCH of the cellular UE received by the eNB, which is expressed by Equation 2 below.

$$P_{D2D}(i)=\beta \cdot P_{PUSCH}(i)[dbm] \qquad \text{Equation 2}$$

In Equation 2, $P_{PUSCH}(i)$ denotes transmission power of the cellular PUSCH used in an ith subframe defined in Equation 1, and β denotes a scaling factor, which has a value between 0 and 1. β may be a parameter for controlling transmission power of the D2D UE. Information on Equation 1 including β may be expressed as power control information or power related information, and the UE may transmit data for D2D communication with specific transmission power when β is known. In this specification, β may be called a power control parameter for controlling transmission power. β defined in Equation 2 becomes smaller as a position of an RB, which the eNB allocates to the transmission D2D UE, is closer to a frequency of the PUCCH, and β becomes larger as the position of the RB, which the eNB allocates to the transmission D2D UE, is farther from the frequency of the PUCCH.

Further, the UE may receive resource allocation information for D2D communication from the eNB in operation S602. In a case of type 2 discovery and mode 1 communication, the eNB directly allocates and transmits resources to be used by the UE, so the UE may perform D2D communication by using the resources allocated by the eNB in operation S604. In Equation 1, β may be explicitly transmitted to the UE together with resource allocation information when the eNB performs resource allocation for type 1 discovery and mode 2 communication, or may be implicitly mapped to resources, so as to allow the UE having received resource allocation information from the eNB may infer β to be used solely by the UE.

When the eNB explicitly transmits β to the UE, UE-specific higher layer signaling (RRC signaling) may be used, or a Transmit Power Control (TPC) command included in a Downlink Control Information (DCI) format 0/3/3A transmitted to the PDCCH corresponding to a current downlink control channel may be transmitted to the UE. When the TPC command is transmitted to the UE, the eNB should make the D2D transmission UE in the RRC-Connected mode identify whether the TPC command received from the eNB is a TPC command for cellular PUSCH transmission or a TPC command for D2D PUSCH transmission. For example, the eNB masks and transmits a Cyclic Redundancy Code (CRC) of DCI by using a UE-specific RNTI for D2D, and the D2D transmission UE having received the CRC of DCI de-masks and receives the CRC of DCI by using an RNTI for D2D. In operation S603, the D2D transmission UE having received the DCI sets D2D transmission power by using β included in the DCI.

A parameter $\Delta_{TF}(i)$ related to Modulation and Coding Scheme (MCS) defined in Equation 1 results from the MCS set according to a quality of channels of the eNB and the UE. Accordingly, in Scheduling Assignment (SA) transmission of D2D discovery and D2D communication that always uses a fixed MCS rather than a variable MCS according to a channel, $\Delta_{TF}(i)$ may not be needed to control D2D transmission power. At this time, that $\Delta_{TF}(i)$ may not be needed means that separate signaling from the eNB is not needed or the corresponding value is not used for calculating transmission power. That separate signaling is not needed means that the UE may solely calculate $\Delta_{TF}(i)$ without signaling from the eNB since the fixed MCS is used. Further, f(i) in Equation 1 is a power control parameter dynamically allocated by the eNB to correct channel quality when the channel quality of the eNB and the UE rapidly changes, so that) f(i) may not be needed to control D2D transmission power when a D2D configuration change is rapidly made. In this case, $\delta_{PUSCH}$ used in f(i) is useless. Since $\delta_{PUSCH}$ is transmitted from the eNB through the DCI, β may be used to control transmission power of the D2D transmission UE instead of $\delta_{PUSCH}$. In order to transmit β to the UE by using the DCI of the PDCCH, a type 2 resource pool allocation period, a mode 1 communication SA, and a mode 1 communication data allocation period should be considered. That is, f(k)=f(k−1)+β(k−T_subframe) when accumulated power control is used, and f(k)=β(k−T_subframe) when absolute power control is used, where k is the type 2 resource pool allocation period and the mode 1 communication SA and data allocation period. In other words, in the case of accumulated power control, f(k) of a kth period, which transmits SA and data of type 2 discovery or mode 1 communication, may use f(k−1), which is used in a just previous period (k−1th period) and β allocated by the eNB at K-Tsubframe time through the PDCCH. When the absolute power control is used, Tsubframe may use β allocated by the eNB at K-Tsubframe time through the PDCCH based on the kth period, which transmits SA and data of type 2 discovery or mode 1 communication.

Figure 7:
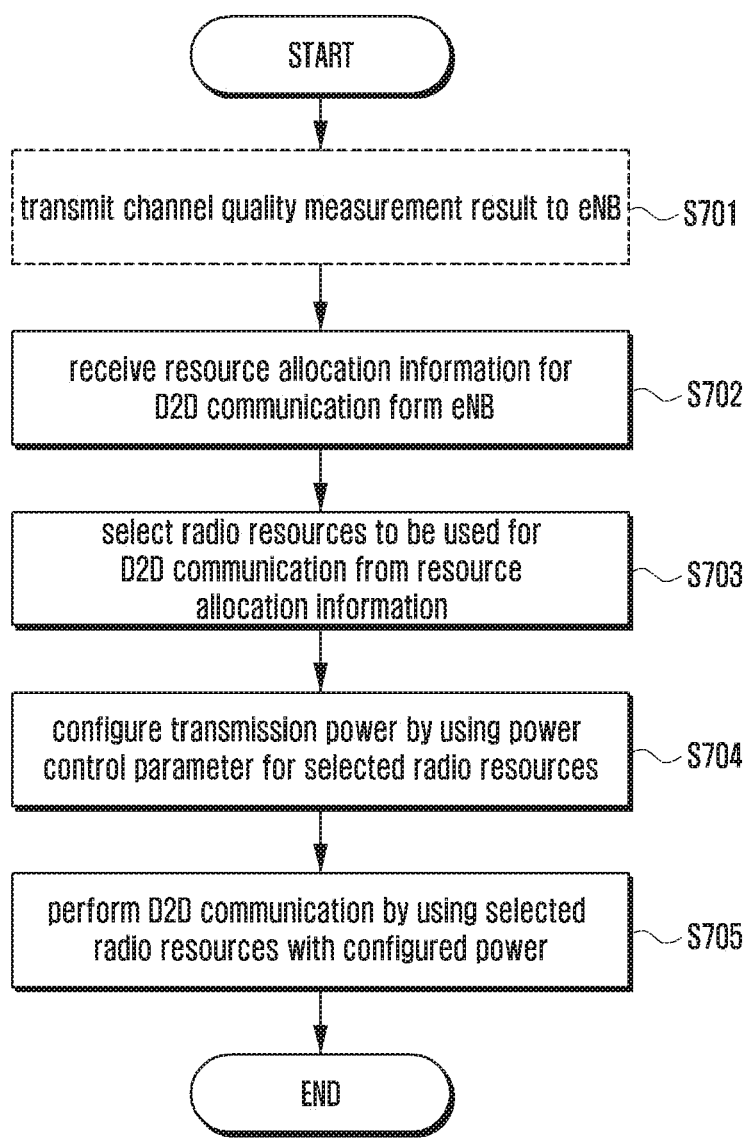
FIG. 7 illustrates an embodiment of a method of controlling transmission power of a D2D UE according to the present disclosure.

FIG. 7 illustrates another embodiment of the method of controlling transmission power of a D2D UE, which is a method of controlling transmission power independently operating without a connection with resource allocation according to an embodiment of the present disclosure.

Referring to FIG. 7, a transmission power control method in type 1 discovery and mode 2 communication that support transmission of the RRC_Idle UE is illustrated. The following description will be made based on type 1 discovery and mode 2 communication, but the present disclosure is not limited thereto.

The UE may measure downlink channel quality and report the measured downlink channel quality to the eNB, or may transmit the SRS to allow the eNB to measure uplink channel quality in operation S701. However, in a type 1 discovery and mode 2 communication scheme, since a D2D transmission resource area is known to D2D UEs, an operation of determining a transmission resource area according to the channel state measurement performed in operation S701 may be omitted (indicated by dotted lines in FIG. 7). More specifically, the type 1 discovery and mode 2 communication scheme makes support such that the D2D transmission UE in the RRC_Idle mode transmits control information (SA) or D2D data for D2D discovery and D2D communication. To this end, the eNB broadcasts the D2D transmission resource area to D2D UEs through the SIB in operation S702 unlike type 2 discovery (mode 1 communication) in which time-frequency resources of the D2D transmission UE are semi-persistently or dynamically scheduled.

The MCS related parameter $\Delta_{TF}(i)$ defined in Equation 1, f(i) information (accumulated power control or absolute power control) determined through higher layer signaling, and $\delta_{PUSCH}$ information transmitted through DCI of the PDCCH cannot be used as power control parameters for the D2D transmission UE in the RRC_Idle state. That is, in a case of the D2D UE, the power control may be performed only using $M_{PUSCH}(i)$, $P_{O\_PUSCH}(j)$, and α(j) in Equation 1. Since $M_{PUSCH}(i)$ is the RB size used for type 1 discovery message transmission $M_{PUSCH}(i)$, may have a fixed value (that is, all UEs performing type 1 discovery use the same size RB, for example, 2 RBs on a frequency axis). At this time, when a normal CP is used, 1 RB may include 12 subcarriers on a frequency axis and 14 SC-FDM symbols on a time axis. When an extended CP is used, 1 RB may include 12 subcarriers on a frequency axis and 12 SC-FDM symbols on a time axis. Further, in $P_{O\_PUSCH}(j)$: $P_{O\_NOMINAL\_PUSCH}(j)+P_{O\_UE\_PUSCH}(j)$ of Equation 1, $P_{O\_UE\_PUSCH}(j)$ is a UE-specific value, and thus cannot be provided by the eNB when the RRC_Idle UE performs D2D transmission (discovery or communication). Accordingly, when open loop power control is used for the D2D transmission UE in the RRC_Idle state, $P_{O\_PUSCH}(j)$ becomes $P_{O\_NOMINAL\_PUSCH}(j)$. α(j) is a cell-specific value, and thus may be used for D2D open loop power control for supporting the RRC_Idle UE. In power control of the cellular uplink PUSCH, j=0 may mean semi-persistent grant, j=1 may mean dynamic scheduling grant, and j=2 may mean random access response grant. This means that the eNB may make $P_{O\_PUSCH}(j)$ and α have different values according to j. Basically, since purposes of cellular uplink PUSCH power control and D2D power control are different from each other, $P_{O\_PUSCH}(j)$ and α used for the cellular uplink PUSCH power control may have freedom to operate differently from values used for the D2D transmission power control. Accordingly, when open loop power control is used, $P_{PUSCH}(i)$ is as Equation 3 below. Since the open loop power control is not power control operating in association with resource allocation, β may have the same value with respect to all resources (e.g., β=1 or β=0.8).

$$P_{D2D}(i) = \beta \cdot P_{PUSCH}(i)[dbm] = \min\left\{ \begin{array}{l} P_{CMAX}(i), \\ 10\log_{10}(M_{PUSCH}(i)) + \\ P_{O\_NOMINAL\_PUSCH}(j) + \alpha(j) \cdot PL \end{array} \right\}[dBM] \quad \text{Equation 3}$$

The aforementioned D2D transmission UE power control in the type 2 discovery and mode 1 communication may be also used for type 1 discovery and mode 2 communication. That is, in operation S703, the UE may select a radio resource RB to be used by the UE within a D2D transmission resource pool for type 1 discovery and mode 2 communication. A reference which may be used by the UE for the selection may be one of the random resource selection scheme or the energy sensing scheme, but the present disclosure is not limited thereto.

The power control method in Equation 3 may operate in association with resource selection by the UE. That is, β in Equation 3 does not have the same value with respect to all resources but may have different values according to each RB.

When the UE selects radio resources to be used for D2D communication, transmission power may be determined using a power control parameter value mapped to each RB in operation S704. β which is the power control parameter for determining transmission power may be already known to the UE through a table or such a mapping table may be broadcasted by the eNB through the SIB. Thereafter, in operation S705, the D2D transmission UE selects RB(s), which the D2D transmission UE will transmit, from the TX resource pool, and then performs D2D transmission by applying β.

Figure 8:
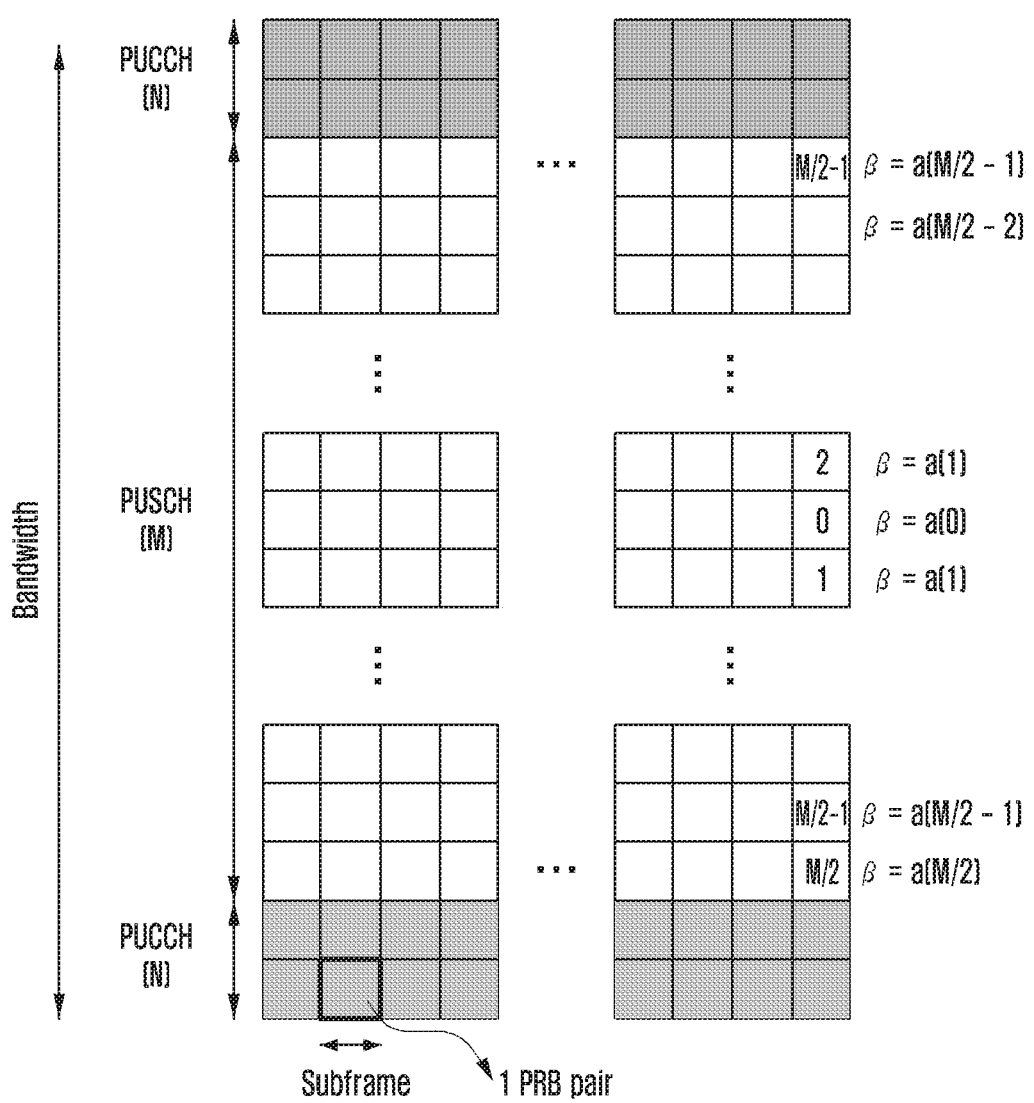
FIG. 8 illustrates an example of a method of controlling D2D transmission power considering resource allocation according to an embodiment of the present disclosure.

FIG. 8 illustrates an example of a D2D transmission power control method considering resource allocation according to an embodiment of the present disclosure.

Referring to FIG. 8, it is assumed that RBs for 2N PUCCHs exist upward and downward within the bandwidth.

When it is assumed that M RBs except for 2N PUCCH RBs are allocated to D2D PUSCHs, if RB indexes are distributed upward and downward based on the center (RB index 0), upper and lower indexes may be different (M is an even number) or may be the same (M is an odd number) according to whether M is an even number of an odd number. Although FIG. 6 illustrates an example when M is an even number, the same method may be applied when M is an odd number. In a case of implicit mapping, β, which a transmission power scaling value corresponding to each RB index, exists. As the RB index is larger, β becomes smaller (that is, $(0)>a(1)>a(2)>a(M/2-1)>a(M/2))$. When the D2D transmission UE selects solely the UE's own transmission resources from the given resource pool (Type 1 discovery, Mode 2 communication), the D2D transmission UE uses β corresponding to the transmission power scaling value, which is mapped with the resources selected by the D2D transmission UE through the implicit mapping. When the eNB allocates RBs to be used by the D2D transmission UE (Type 2 discovery and mode 1 communication), the eNB may inform the UE of β together with the allocated RB index. Although every RB index has a corresponding β in FIG. 6, various modifications may be made. For example, two RB indexes may have the same β, or two or more RB indexes may have the same β. However, as the RB index increases (closer to the PUCCH) β should be reduced.

The present disclosure also proposes a D2D transmission power control method for supporting three discovery classes (short/medium/long range) defined according to a discovery range (or coverage) in D2D discovery.

D2D Transmission Power Control Method for Supporting Discovery Range Class $3^{rd}$ Generation Partnership Project (3GPP) Service and System Aspects (SA) Working Group (WG) defines three discovery classes of short/medium/long according to the discovery range for D2D Proximity-based Services (ProSe). Radio Access Network (RAN) Working Group 1 (WG1) (i.e., referred to as RAN1) in charge of the standard of a 3GPP Physical layer has determined to reflect service requirements defined by SA WG in the RAN1 standardization. Accordingly, the present disclosure proposes a D2D transmission power control method in which the following discovery range classes are reflected.

The transmission power control method proposed by the present disclosure will be divided into a case where resource allocation is not considered and a case where resource allocation is considered.

Option 1 (D2D transmission power control method which does not consider resource allocation): when it is assumed that D2D transmission power control is performed based on Equation 3, the D2D transmission UE compares a D2D transmission power value defined in the UE's own discovery range class with a currently available transmission power value and performs D2D transmission by using transmission power having a minimum value. For example, it is assumed that maximum transmission power of the UE is defined as short=PShort, medium=PMedium, long=PLong according to the discovery range class and the current discovery service is a service supporting the long range. Further, it is assumed that power which may be used by the UE for current D2D transmission is PD2D (at this time, PLong>PD2D). At this time, power which may be used by the D2D transmission UE for D2D transmission should be set to min (PLong, PD2D). This is because, although the D2D transmission corresponds to a service supporting the long range to prevent the IBE, ICI, and ISI problems generated in the receiving end of the eNB, the D2D transmission is performed using a PD2D value to protect the existing legacy UE. Unless the eNB is impacted, the D2D discovery range class may be supported.

That is, when it is assumed that the current discovery service is a service supporting the short range (at this time, PShort<PD2D), min(PShort, PD2D)=PShort and thus the short range class may be supported.

In the aforementioned example, when PLong>PD2D, transmission power which may be used by the D2D transmission UE is min(PLong, PD2D)=PD2D. Accordingly, requirements of the discovery range class which should support the long range may not be met. In this case, repetitive transmission may be used to increase the discovery range, and the present disclosure considers a discovery range extension through the repetitive transmission. This will be described below in more detail with reference to FIGS. 12, 13, and 14.

Option 2 (D2D transmission power control method considering resource allocation): the aforementioned option 1 may be applied in association with resource allocation. That is, when transmission power for supporting the discovery range class is larger than transmission power for reducing IBE, ICI, and ISI generated in the eNB (PX>PD2D, where X∈{short, medium, long}), the eNB transmits a command (explicit mapping) or the solely UE makes a determination (implicit mapping) to perform D2D transmission in resources having large β (e.g., β=1).

Figure 9:
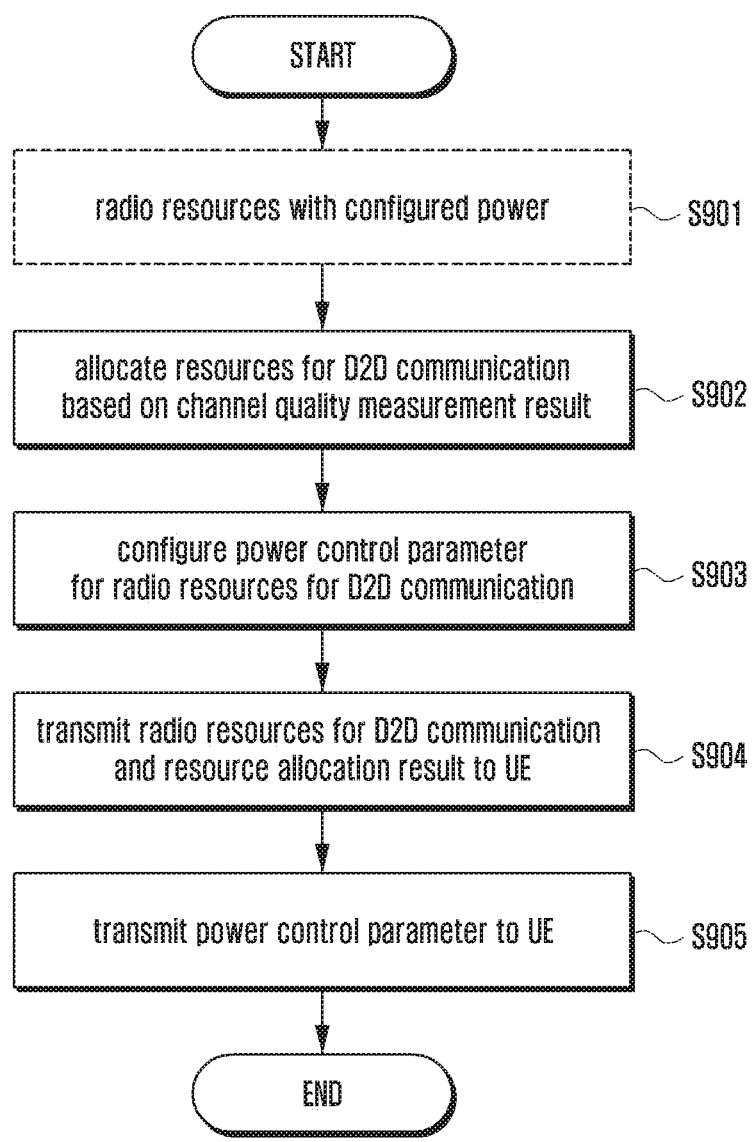
FIG. 9 is a flowchart illustrating an operation of an evolved NodeB (eNB) in a method of controlling transmission power of a D2D UE according to an embodiment of the present disclosure.

FIG. 9 is a flowchart illustrating an operation of the eNB in a method of controlling transmission power of a D2D UE according to an embodiment of the present disclosure.

Referring to FIG. 9, the eNB may receive a result of measurement of downlink channel quality from the UE or, when the UE transmits an SRS to allow the eNB to measure uplink channel quality, the eNB may measure the uplink channel quality in operation S901.

In operation S902, the eNB may determine a transmission resource area to be used by the D2D UE based on the received channel quality result or allocate resources in the transmission resource area to the D2D UE.

In operation S903, the eNB may set power control parameters for specific radio resources to be used by the D2D UE. Further, the eNB may determine power control parameters for each RB of the transmission resource area which may be used by the D2D UE. A method of setting power control parameters by the eNB may follow the description in FIG. 6, Equation 2, or Equation 3.

In operation S904, the eNB may transmit the transmission resource area determined or allocated in operation S902 or the resource allocation result to the UE.

In operation S905, the eNB may transmit the determined power control parameters to the UE. The eNB may transmit the power control parameters together with or separately from the transmission resource area or the resource allocation result transmitted in operation S904. More specifically, a method of transmitting the power control parameters may vary depending on a D2D discovery or communication scheme.

In a case of type 2 discovery and mode 1 communication, when resources are allocated to the D2D UE, the resources may be explicitly transmitted to the UE together with resource allocation information, or the UE having received the resource allocation information from the eNB may infer the power control parameters to be used by the UE since the power control parameters are implicitly mapped to the resources.

When the eNB explicitly transmits the power control parameters to the UE, UE-specific higher layer signaling (RRC signaling) may be used, or a TPC command included in a DCI format 0/3/3A transmitted to the PDCCH corresponding to a current downlink control channel may be transmitted to the UE. When the TPC command is transmitted to the UE, the eNB should make the D2D transmission UE in the RRC-Connected mode identify whether the TPC command received from the eNB is a TPC command for cellular PUSCH transmission or a TPC command for D2D PUSCH transmission. For example, the eNB masks and transmits a CRC of DCI by using a UE-specific RNTI for D2D, and the D2D transmission UE having received the CRC of DCI de-masks and receives the CRC of DCI by using an RNTI for D2D. The D2D transmission UE having received the DCI sets D2D transmission power by using the power control parameters included in the DCI.

Further, in a case of type 1 discovery and mode 2 communication, the eNB may broadcast the D2D transmission resource area to D2D UEs through the SIB unlike type 2 discovery (mode 1 communication) in which time-frequency resources of the D2D transmission UE are semi-persistently or dynamically scheduled. Accordingly, in this case, the power control parameter value mapped according to each RB may be already known to the UE through a table, and such a mapping table may be broadcasted by the eNB through the SIB. The D2D transmission UE selects RB(s), which the D2D transmission UE will transmit, from the TX resource pool, and then performs D2D transmission by applying the power control parameter.

Figure 10:
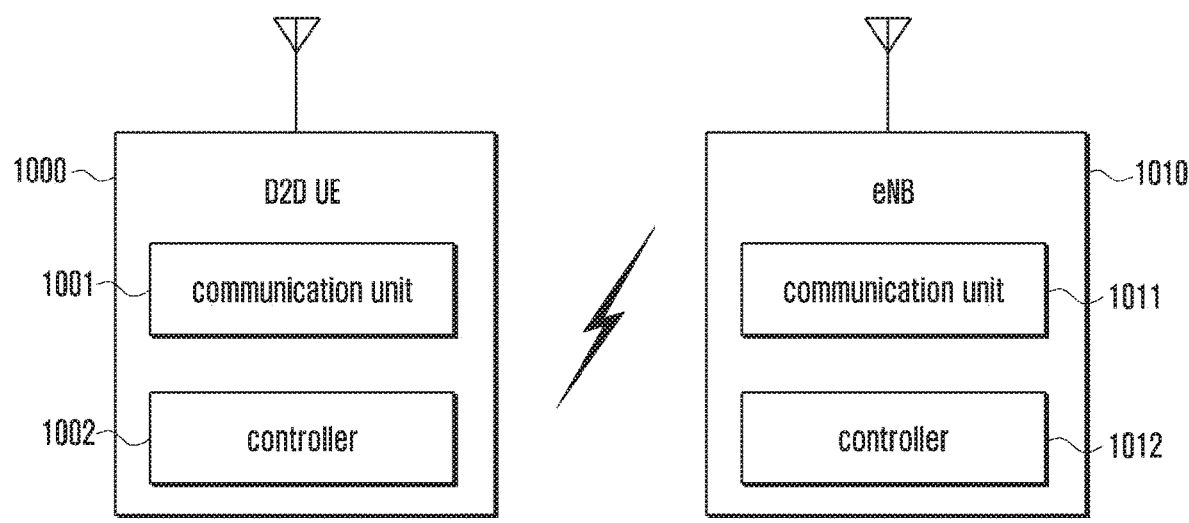
FIG. 10 is a block diagrams illustrating a D2D UE and an eNB according to an embodiment of the present disclosure.

FIG. 10 is block diagram illustrating a D2D UE and an eNB according to an embodiment of the present disclosure.

Referring to FIG. 10, a D2D UE 1000 according to the present disclosure may include a communication unit 1001 and a controller 1002.

The communication unit 1001 may exchange data between the D2D UE and the eNB or broadcast a discovery signal to be used for communication with another D2D UE or a signal for communication.

The controller 1002 may receive, from the eNB, power control information corresponding to radio resources used for D2D communication by the UE, determine transmission power for radio resources to be used for D2D communication by the UE among the radio resources, and transmit data for D2D communication with the transmission power determined using the radio resources to be used for the D2D communication by the UE.

The power control information may be information for determining transmission power for D2D communication of the UE based on transmission power of an uplink data channel (PUSCH) of a wireless communication UE to be received by the eNB.

Further, the power control information may be transmitted to the UE by the eNB through higher layer signaling (RRC signaling) or through the uplink control channel (PUCCH), which has been described above.

Further, the power control information may include information indicating that transmission power of the UE is reduced as a frequency of radio resources to be used by the UE is closer to a frequency of the PUCCH to be received by the eNB in order to allow the D2D communication to not cause interference in transmission of the uplink control information channel (PUCCH) of the wireless communication system.

In addition, the power control information may be information determined in the unit of RBs of the radio resources to be used by the UE.

The eNB 1010 supporting D2D communication according to the present disclosure may include a communication unit 1011 and a controller 1012.

The communication unit 1011 may perform data communication between the eNB and various nodes.

The controller 1012 may determine radio resources used by the UE for D2D communication, generates power control information corresponding to the radio resources used by the UE for the D2D communication, and transmit the determined power control information to the UE.

The power control information is the same as that described for the UE apparatus, so a detailed description thereof is omitted.

In this specification, repetitive transmission or repetition may be used as the same meaning. The reception UE may combine repeatedly transmitted resources according to a chase combining or incremental redundancy method and decode a corresponding discovery signal.

The present disclosure also proposes a D2D repetitive transmission method to maintain a D2D discovery and D2D communication range (coverage) when D2D transmission power control is performed. That is, according to the aforementioned embodiment of the present disclosure, when the D2D transmission power control is performed to prevent the IBE, ICI, and ISI problems generated in the eNB by the D2D transmission, the D2D range (or discovery) may vary depending the position of the D2D transmission UE within the cell or the discovery range class. In this case, a method of maintaining the D2D range may be considered. This will be described below in more detail with reference to FIG. 11.

Figure 11:
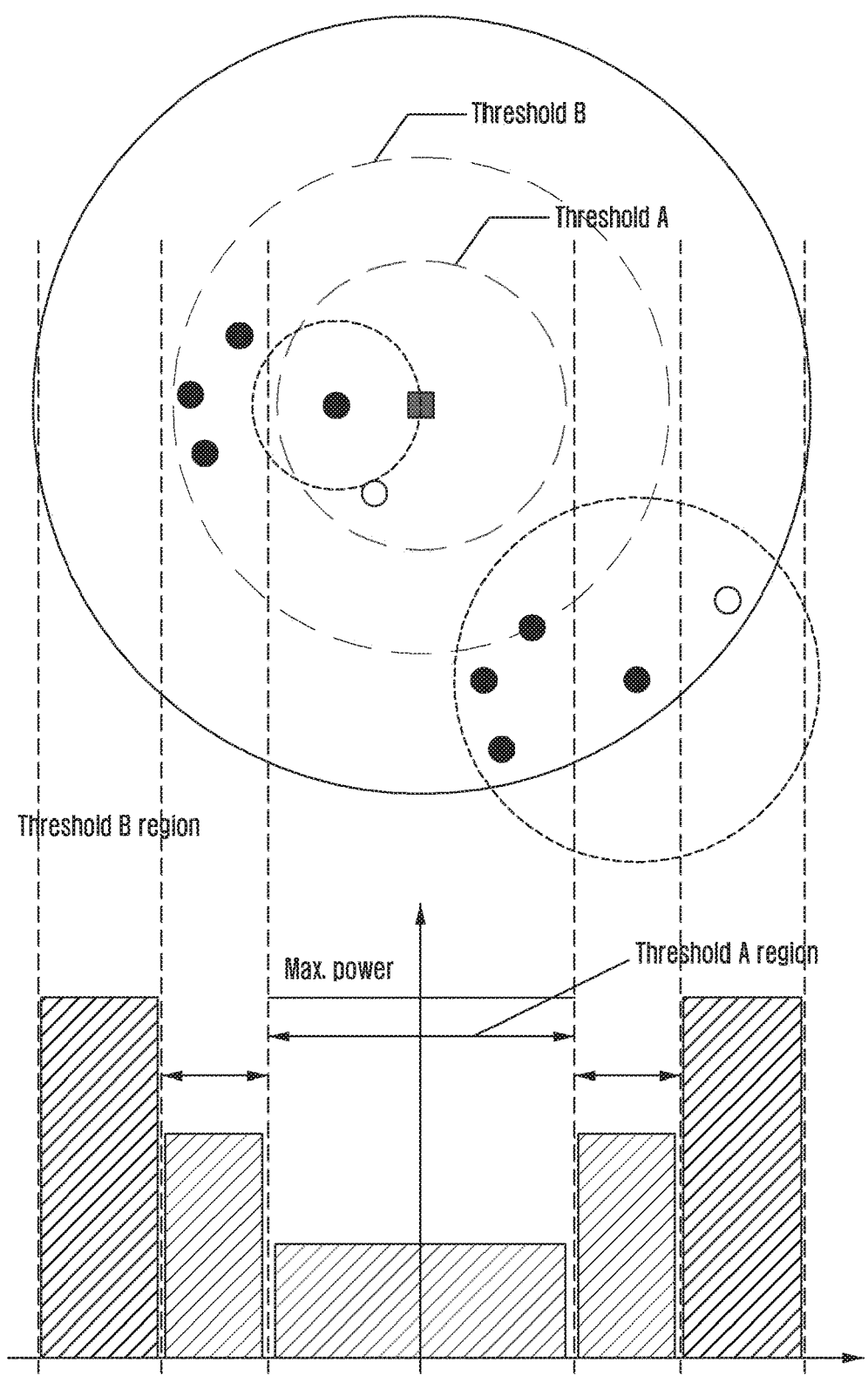
FIG. 11 is a view describing a method of maintaining a D2D communication range according to an embodiment of the present disclosure.

FIG. 11 is a view describing a method of maintaining a D2D communication range according to an embodiment of the present disclosure.

2) Method of Maintaining Discovery and Communication Ranges when D2D Transmission Power is Controlled Referring to FIG. 11, when the D2D transmission power control is performed to prevent the IBE, ICI, and ISI problems generated in the eNB by the D2D transmission, the D2D range (or discovery) may vary depending the position of the D2D transmission UE within the cell or the discovery range class. In this case, since D2D performance may be reduced according to the reduction in the D2D range, a method of solving the problem is required. More specifically, through the transmission with relatively reduced transmission power to prevent the IBE, ICI, and ISI, the communication may be stabilized while minimizing a change in the D2D range which may be reduced due to repetition.

However, although this specification describes that repetitive transmission is performed according to the power control, the repetitive transmission and the power control do not have to have a correlation therebetween. That is, the range of the D2D UE may be secured by the repetitive transmission, and this specification describes the repetitive transmission method as only an embodiment to solve a performance decrease according to the power control.

Referring to FIG. 11, in type 1 discovery and mode 2 communication, when the D2D UE receives information on the D2D resource pool through the SIB, the D2D UE may receive D2D transmission power and the number of repetitions according to the D2D transmission power from the eNB through the SIB in the form shown in Table 1 below.

TABLE 1

Parameters of transmission power and repetition
of the D2D UE through the SIB

| | Threshold A | Threshold B |
|---|---|---|
| Transmission Power | P0 dBm | P1 dBm |
| Number of repetitions | N0 repetitions | N1 repetitions |

Based on Table 1, P0<P1 and N0>N1. That is, a D2D transmission UE using high transmission power (P1) may not perform repetition or perform the small number of repetitions (N1). In contrast, a D2D transmission UE using low transmission power (P0) uses the large number of repetitions (N0). For such an operation, the D2D transmission UE may measure channel quality between the eNB and the D2D transmission UE by using one of a CRS, a Demodulation Reference Signal (DMRS), a Channel State Information Reference Signal (CSI-RS), a Multicast and Broadcast Single Frame Network Reference Signal (MBSFN RS), and a Positioning Reference Signal (P-RS), which are transmitted from the eNB through the downlink. For example, the D2D transmission UE may measure channel quality by measuring Reference Signal Received Power (RSRP), Reference Signal Received Quality (RSRQ), and the like by using the CRS. Alternatively, the D2D transmission UE may predict a path-loss between the eNB and the D2D transmission UE by using one or a plurality of RSs.

That is, in order to determine the number of repetitions, the D2D UE or the eNB may measure a channel state or predict a path-loss between the UE and the D2D transmission UE by using one or more RSs. In this case, a threshold is determined based on a case where RSRP, RSRQ, or path-loss corresponding to the measured channel quality is not met, and the number of repetitions may be determined based on the threshold. Accordingly, any of the RSRP, RSRQ, and path-loss, by which the channel state may be determined, may be used to determine the threshold.

However, for the convenience of the description, a threshold A or a threshold B may be described as a value related to the path-loss or distance, but the present disclosure is not limited thereto.

Referring to FIG. 11, D2D transmission UEs nearby the eNB (that is, UEs having a small path-loss) use low transmission power (P0) and use the large number of repetitions (N0) to minimize the IBE, ICI, ISI problems occurring in the eNB. Unlike this, D2D transmission UEs far away from the eNB (UEs having a large path-loss) may use high transmission power (P1) and use the small number of repetitions (N1) or no repetition since the eNB is slightly or is not influenced by the IBE, ICI, ISI problems.

Accordingly, the UE may determine transmission power and the number of repetitions based on channel quality information which the UE measures with the eNB and the information of Table 1 received through the SIB. Further, the information of Table 1 associated with the transmission power and the number of repetitions may not be transmitted through the SIB, but may be pre-stored in the D2D UE.

In type 2 discovery and mode 1 communication in which the eNB allocates time-frequency resources to be transmitted by the D2D UE, the eNB may inform D2D transmission UEs of resource allocation, transmission power parameters, and the number of repetitions through a downlink control channel (PDCCH) or RRC signaling.

The repetition according to an embodiment of the present disclosure may be used for supporting a discovery range class as well as minimizing a D2D discovery change according to a power control.

That is, the D2D transmission power control is performed to reduce the influence on the eNB through the transmission power control method according to the present disclosure, but D2D UE coverage may be increased to support the discovery range class. In this case, predefined transmission power and the predefined number of repetitions may be used.

Referring to FIG. 11, the eNB may inform of the threshold A, threshold B, and transmission power and the number of repetitions according to the thresholds through the SIB. Although FIG. 11 illustrates an example of operating two thresholds (A and B) for the convenience of the description, one threshold or three or more thresholds may be used. D2D transmission UEs having received the information of Table 1 through the SIB measure downlink channel quality between the eNB and the UEs and compare the measured downlink channel quality with a threshold. Based on the threshold, transmission power and the number of repetitions of the D2D transmission UE are determined. In type 2 discovery and mode 1 communication in which the eNB allocates time-frequency resources to be transmitted by the D2D UE, the eNB may inform D2D transmission UEs of resource allocation, transmission power parameters, and the number of repetitions through a downlink control channel (PDCCH) or RRC signaling without operating the pre-matched repetition.

A power control and a repetition method according to an embodiment of the present disclosure will be described in more detail.

Figure 12:
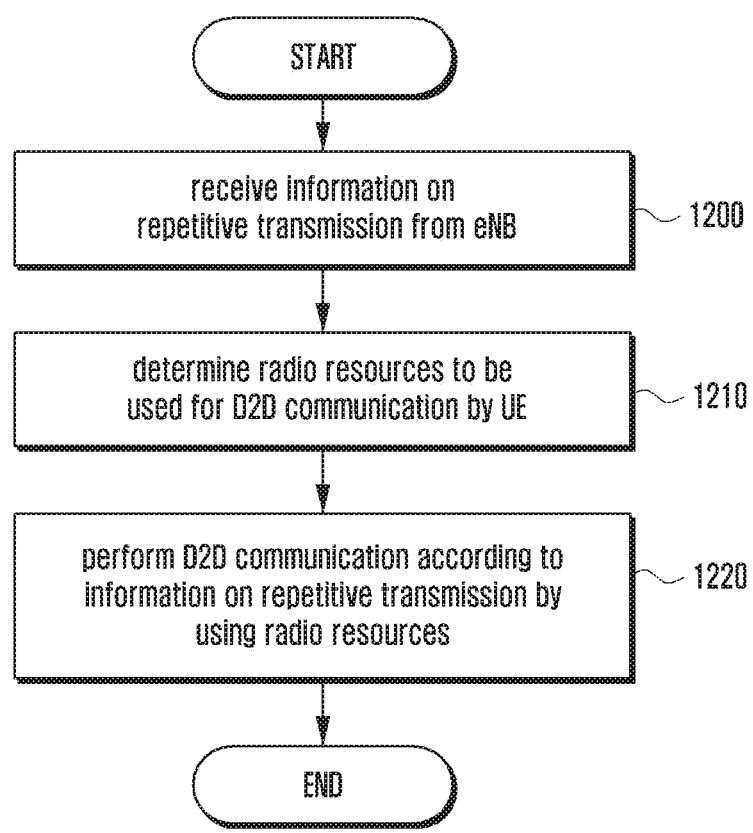
FIG. 12 illustrates a method of maintaining a D2D communication range and shows a case where there are a plurality of discovery resource pools within one discovery period according to an embodiment of the present disclosure.

FIG. 12 is a flowchart illustrating a repetitive transmission method by the UE according to an embodiment of the present disclosure.

Referring to FIG. 12, the UE first receives information on repetitive transmission from the eNB in operation 1200. The information on the repetitive transmission may have various forms. More specifically, the information may be information related to transmission power in radio resources and the number of repetitive transmissions when the transmission is made with the corresponding transmission power. Further, the information may be predetermined threshold information, and the UE may directly determine the number of repetitive transmissions by using the corresponding value. In this case, the threshold information may be at least one of RSRP, RSRQ, or a path-loss between the eNB and the UE, which indicates channel quality between the eNB and the UE.

Further, information in which the number of repetitive transmissions is pre-mapped to each radio resource may be provided. In this case, the information is combined with the aforementioned power control method, and transmitted together with information on power control parameters and repetitive transmission. In a case of type 1, the information may be transmitted to the UE through the SIB, but the present disclosure is not limited thereto.

In operation 1210, the UE may determine radio resources to be used for D2D communication among the radio resource pool provided by the eNB. A detailed method for the determination may be variously implemented according to a D2D communication scheme. That is, in the case of type 1, radio resources to be used may be determined randomly or according to an energy level, or determined according to a channel state between the UE and the eNB. A detailed radio resource determination method or various embodiments for determining repetitive transmission according to the corresponding radio resources will be described below with reference to FIG. 14 in more detail.

Thereafter, the UE performs D2D communication according to information on repetitive transmission in the determined radio resources in operation 1220.

Figure 13:
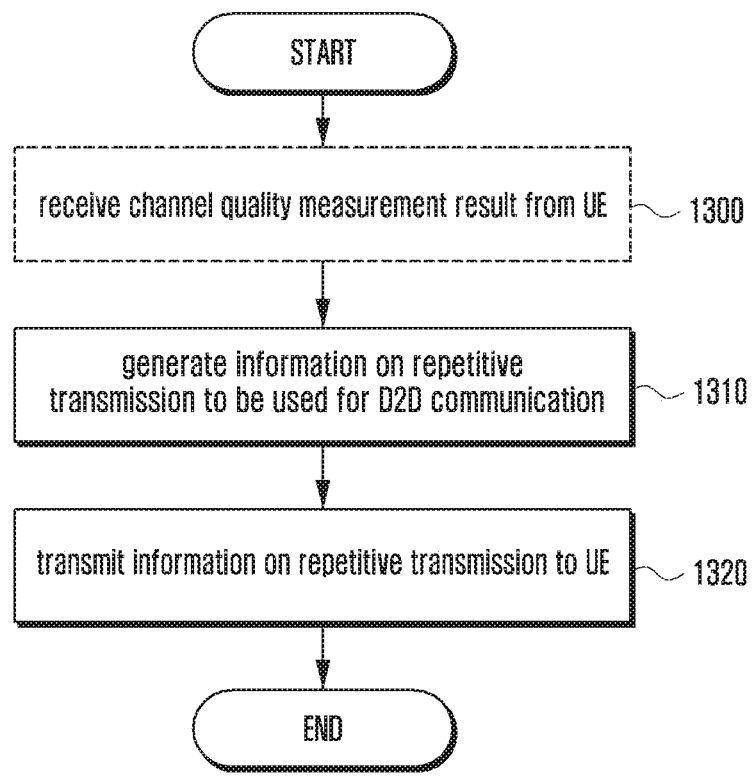
FIG. 13 illustrates an embodiment of the method of maintaining the range of D2D communication and shows a case where a number of repetitive transmissions varies depending on a position of a time axis in one resource pool existing within one discovery period according to an embodiment of the present disclosure.

FIG. 13 illustrates an embodiment of a method of maintaining the range of D2D communication according to an embodiment of the present disclosure.

Referring to FIG. 13, the number of repetitive transmissions may vary depending on a position of a time axis in one resource pool existing within one discovery period.

Referring to FIG. 13, the eNB may generate information on repetitive transmission to be used for D2D communication in operation 1310. The information on the repetitive transmission may be the number of repetitive transmissions corresponding to transmission power of the UE.

Alternatively, the information on the repetitive transmission may be threshold information used for determining the number of repetitive transmissions for data transmission by the UE. When the UE transmits data with predetermined transmission power, after a channel state between the eNB and the D2D UE is measured using at least one RS, the threshold information may be used for determining the number of repetitive transmissions according to the measured channel state. The threshold may be at least of the RSRP, the RSRQ, or the path-loss between the eNB and the UE.

Accordingly, before operation 1310, the eNB may receive a channel quality result from the UE in operation 1300. However, since it is not necessary to generate the information on the repetitive transmission according to the channel state result received from the UE, operation 1300 is indicated by the dotted line. For example, the number of repetitions may be mapped to the resource pool. That is, repetition N1 is implicitly mapped to resource pool A1 and repetition N2 is implicitly mapped to resource pool A2. Accordingly, when the UE receives resource pool information from the eNB through the SIB, the UE performs repetitive transmission in the corresponding resource pool. In the same way, the operation may be performed with respect to a plurality of resource pools (see FIG. 14).

Thereafter, the eNB may transmit the generated information on the repetitive transmission to the UE in operation 1320.

A transmission method has no limitation, but in a case of type 1 discovery, the information may be transmitted to the UE through the SIB. The D2D transmission UE operating based on type 2 is in an RRC_Connected mode. Accordingly, unlike the cellular UE of the related art, the UE cannot directly receive a command from the eNB such as transmission power of a discovery signal and the number of transmissions of a discovery signal. The command may be transmitted through UE-specific RRC signaling or using a DCI transmitted through an (enhanced) PDCCH ((e)PDCCH). However, in order to combine and decode discovery signals received through repetitive transmission, the D2D reception UE also should know whether the repetitive transmission is performed and the number of repetitive transmissions. Accordingly, in type 2, the number of repetitive transmissions may be broadcasted to all UEs within the cell through the SIB. When both the type 1 discovery and the type 2 discovery are supported in one cell, coverage requirements of the two discovery types may be different from each other. Accordingly, the number of repetitive transmissions through the SIB may vary depending on the type 1 discovery and the type 2 discovery.

Various embodiments of the repetitive transmission method of D2D communication which may be applied to FIGS. 12 and 13 will be described with reference to FIGS. 14 to 18 in detail.

Figure 14:
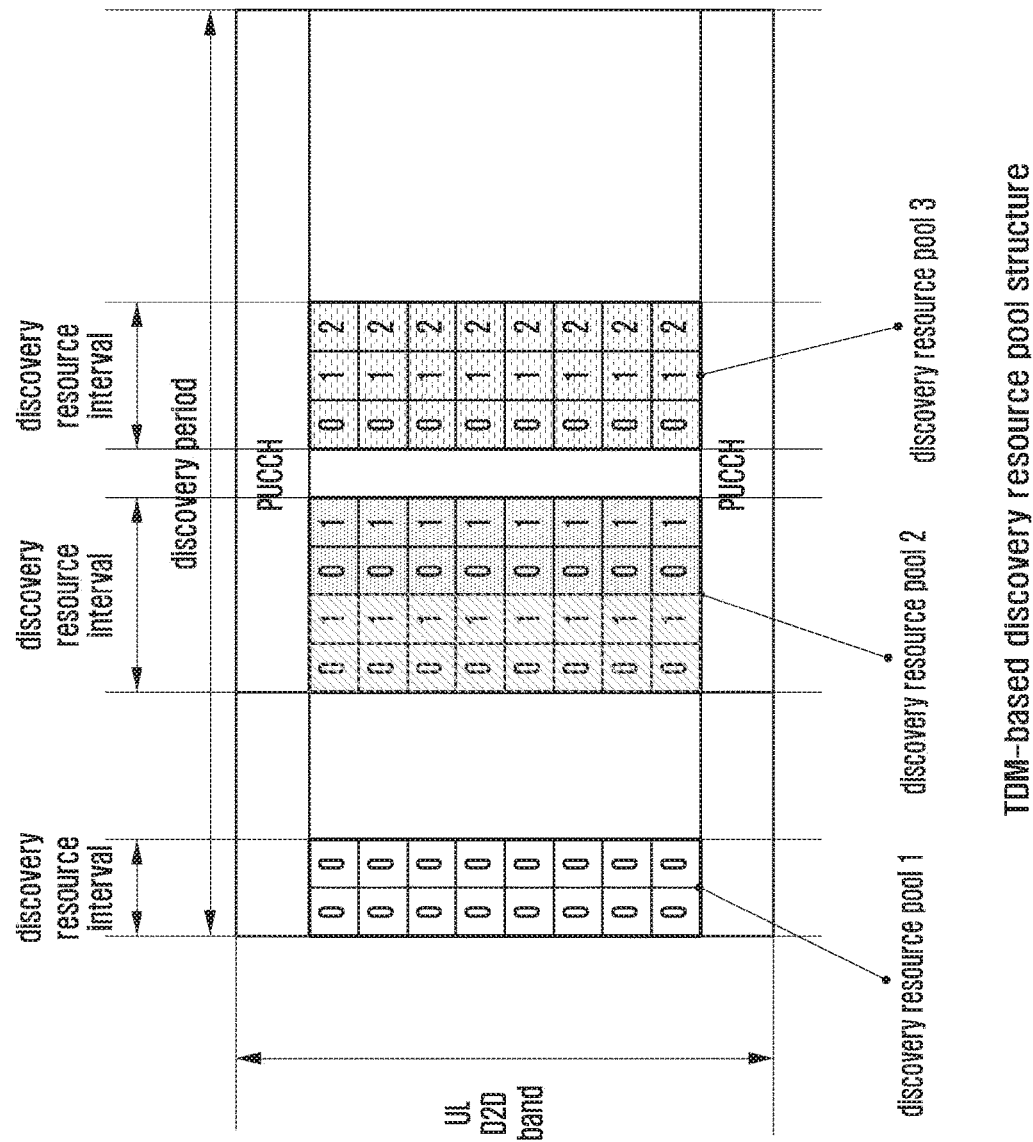
FIG. 14 illustrates an embodiment for maintaining a D2D communication range and shows a case where there is a particular connection relationship between discovery resources for repetitive transmission performed after one discovery signal transmission and time/frequency resources of first discovery signal transmission according to an embodiment of the present disclosure.

FIG. 14 illustrates an embodiment for maintaining a range of D2D communication according to an embodiment of the present disclosure.

Referring to FIG. 14, there is a particular connection relationship between discovery resources for repetitive transmission performed after one discovery signal transmission and time/frequency resources of first discovery signal transmission.

The number of repetitions may be pre-mapped to each of the radio resource pools used for the discovery by the D2D UE. Further, the transmission resource pool and the number of repetitions may be provided to the transmission UE and the reception resource pool and the number of repetitions may be provided to the reception UE through the SIB (for type 1 discovery and mode 2 communication). In addition, the eNB may inform the transmission UE of the transmission resources and the number of repetitions and the reception UE of the reception resource pool and the number of repetitions through the SIB based on UE-specific RRC signaling or (e)PDCCH (for type 2B discovery and mode 1 communication).

That is, FIG. 14 illustrates a case where the eNB informs of a plurality of discovery resource pools within one discovery period, which corresponds to a case where temporally different subframes have different numbers of repetitive transmissions of the discovery signal. At this time, each of numbers 0, 1, and 2 indicate the number of repetitions. That is, 0 indicates a case where there is no repetitive transmission, 0, 1 indicates a case where there is one repetitive transmission, and 0, 1, 2 indicates a case where there are two repetitive transmissions. Accordingly, the number of repetitions may be controlled using temporally different discovery resource pools.

Further, the repetitive transmission may be performed in association with resource allocation. For example, the D2D transmission UE operating based on type 1 may select a discovery resource pool according to a predetermined condition or a condition determined by the eNB like the aforementioned threshold, and determine the number of repetitive transmissions of the discovery resources according to the selected discovery resource pool. More specifically, even though the UE at the cell edge performs D2D transmission by using high transmission power, the eNB may be slightly influenced by the IBE or ICI. Accordingly, the UE transmits a discovery signal by using discovery resource pool 1 without repetitive transmission. However, when the D2D transmission UE nearby the eNB uses high D2D transmission power, a receiving end of the eNB may have a serious IBE or ICI problem. Accordingly, the UE repeatedly transmits a discovery signal with low transmission power by using discovery resource pool 3.

According to various embodiments of the present disclosure, the repetitive transmission may be performed in association with the discovery range class. In the discovery, according to the range class or the coverage requirement, different discovery resource pools may be operated. For example, discovery resource pool 1 may support a short range class, discovery resource pool 2 may support a medium range class, and discovery resource pool 3 may support a long range class in FIG. 14. The resource pool may include one or more subframes, and each range class may include one or more resource pools. Further, as illustrated in FIG. 14, respective resource pools may have different discovery periods while resource pools which support different discovery range classes exist within one discovery period or resource pools which support only one range class exist within one discovery period. For example, discovery resource pool 3 (or a plurality of resource pools) supporting the long range class may repeatedly appear on a period A, discovery resource pool 2 (or a plurality of resource pools) supporting the medium range class may repeatedly appear on a period B, and discovery resource pool 1 (or a plurality of resource pools) supporting the short range class may repeatedly appear on a period C. At this time, different discovery periods of the respective resource pools may mean that the periods A, B, and C are different from each other.

According to an embodiment of the present disclosure, the repetitive transmission may be performed in association with the discovery range class. For example, maximum transmission powers used in the respective discovery range classes are defined as PShort, PMedium, and PLong, and it is assumed that different resource pools supporting the range classes are operated. Accordingly, in FIG. 14, resource pool 1 may support the short range class, and use repetitive transmission 0 and power of PShort. Resource pool 2 may support the medium range class, and use repetitive transmission 1 and power of PMedium. Further, resource pool 3 may support the long range class, and use repetitive transmission 2 and power of Plong.

In an embodiment of the present disclosure, repetitive transmission may be operated in association with the discovery range class, and D2D transmission power. For example, maximum transmission powers used in the respective discovery range classes are defined as PShort, PMedium, and PLong, and it is assumed that different resource pools supporting the range classes are operated. Accordingly, in FIG. 14, since resource pool 1 supports the long range class and uses power of PLong, resource pool 1 may not use repetitive transmission. Since resource pool 2 supports the medium range class and uses power of PMedium, resource pool 2 may expand the coverage through repetitive transmission 1. Lastly, since resource pool 3 supports the short range class and uses power of PShort, resource pool 2 may expand the coverage through repetitive transmission 2.

In an embodiment of the present disclosure, an uplink control channel (PUCCH) exists for uplink feedback of the cellular UE such as ACK/NACK or Scheduling Request (SR), and the number of RBs occupying the PUCCH in a particular subframe and the UE, which will transmit feedback through the PUCCH in the particular subframe, may be determined by an eNB scheduler. That is, the number of RBs of the PUCCH existing above/below the frequency axis of the discovery resource pool within the discovery period may vary depending on the discovery resource pool. In this case, the eNB may differently operate the discovery resource pools according to the number of RBs occupying the PUCCH or whether the PUCCH is scheduled. For example, it is assumed that the PUCCH is not scheduled above/below the frequency axis of discovery resource pool 1, the number of RBs included in the PUCCH in discovery resource pool 2 is 1, and the number of RBs included in the PUCCH in discovery resource pool 3 is 2 or more. In a case of discovery resource pool 1, there is no PUCCH. Accordingly, D2D transmission may be performed using maximum transmission power, so that repetitive transmission is not required. In cases of discovery resource pool 2 and discovery resource pool 3, there are cellular UEs, which use the PUCCH. Accordingly, in order to mitigate the IBE and ICI problems which the D2D UE causes in the PUCCH received by the eNB, the power control is performed. However, since discovery resource pool 2 has the smaller number of RBs included in the PUCCH compared to discovery resource pool 3, discovery resource pool 2 may use relatively high D2D transmission power compared to discovery resource pool 3. D2D UEs performing transmission in discovery resource pool 2 and discovery resource pool 3 may perform D2D transmission according to transmission power, which may be used in the corresponding pools, and the number of repetitive transmissions corresponding to the transmission power.

The type 1 D2D transmission UE receives transmission power and discovery pool information for repetitive transmission of the discovery signal according to the transmission power through the SIB. In the present embodiment, although the discovery resource pools, which use different numbers of repetitive transmissions within one discovery period, have been described for the convenience of the description, as long as discovery resource pools, which use repetitive transmission corresponding to one time within one discovery period, are used, but discovery resource pools, which use different numbers of repetitive transmissions according to discovery periods may be used.

The D2D transmission UE operating based on type 2 is in an RRC_Connected mode. Accordingly, unlike the cellular UE of the related art, the UE cannot directly receive a command from the eNB such as transmission power of the discovery signal and the number of transmissions of the discovery signal. The command may be transmitted through UE-specific RRC signaling or using a DCI transmitted through an (e)PDCCH. In this case, the number of transmissions by the transmission UE may be instructed by the eNB. However, since the reception UE cannot hear the command from the eNB, the reception UE may not know the number of transmissions by the transmission UE. Accordingly, only when the resource pool is mapped to the number of transmissions, the reception UE may know the number of transmissions. That is, when it is assumed that there are resource pool 1, resource pool 2, and resource pool 3, it should be pre-arranged between the eNB and the UE that resource pool 1 performs one transmission (no repetitive transmission), resource pool 2 performs two transmissions (one repetitive transmission), and resource pool 3 performs three transmissions (two repetitive transmissions). Under such an assumption, when the D2D transmission UE operating based on type 2 makes a request for allocating resources to the eNB, the eNB may allocate the number of repetitive transmissions, transmission power, and resources mapped thereto to the D2D UE in consideration of the discovery range class of the D2D transmission UE or IBE, ISI, and ICI effects which the D2D transmission UE may give to the eNB.

In the present embodiment, although two repetitive transmissions are described as the maximum number of repetitive transmissions, more repetitive transmissions may be made (e.g., four or eight repetitive transmissions). Further, although one resource pool is specified to each range class in the description according to various embodiments of the present disclosure, two or more resource pools may be operated for each range class.

Figure 15:
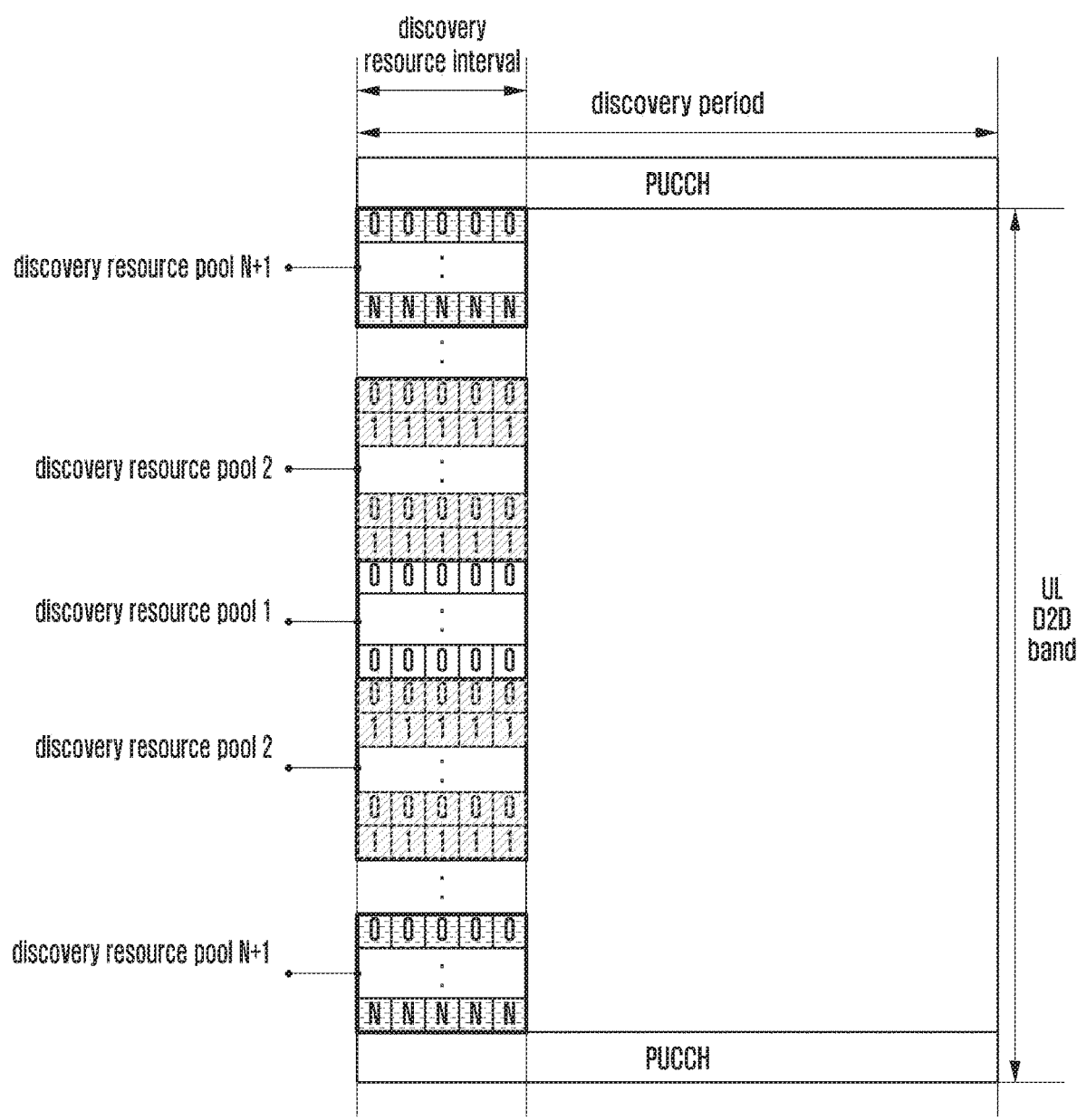
FIG. 15 illustrates an embodiment for maintaining a D2D communication range and shows an operation in which power control, resource allocation, and repetition are connected when discovery resource pools are frequency division-multiplexed and used (repetition on a frequency axis) according to an embodiment of the present disclosure.

FIG. 15 illustrates an embodiment for maintaining a range of a D2D communication according to an embodiment of the present disclosure.

Referring to FIG. 15, when discovery resource pools are frequency division-multiplexed, an operation in which power control, resource allocation, and repetition are connected is illustrated (repetition on the frequency axis).

An operation in which power control, resource allocation, and repetition are connected when discovery resource pools are frequency division-multiplexed. Since UEs performing D2D transmission in discovery resource pool N+1 adjacent to the PUCCH use low transmission power to mitigate the IBE and ICI problems which the UEs may cause in the PUCCH, the UEs may maintain the discovery range through N repetitive transmissions. Since UEs performing D2D transmission in discovery resource pool 1 spaced far away from the PUCCH may use high transmission power, the UEs may perform the D2D transmission without separate repetitive transmission. For UEs performing type 1 D2D, the eNB transmits information on discovery resource pools and transmission power parameters through the SIB. Further, the number of repetitive transmissions may be inserted into the information on the discovery resource pools and then transmitted, or may be separately transmitted. At this time, the eNB may implicitly or explicitly inform of the transmission power (transmission power parameter) and the number of repetitive transmissions which may be used in each discovery resource pool. The implicit method refers to a case where the transmission power and the number of repetitive transmissions are mapped to an index of each discovery resource pool or a position of the discovery resource pool. That is, the eNB may inform type 1 D2D UEs of only time-frequency position information of the discovery resource pool, and the UEs having acquired the information may know transmission power and the number of repetitive transmissions to be used in a particular discovery resource pool through a pre-mapped relationship. The explicit method refers to a case where the eNB informs the UEs of all of the time-frequency position of the particular discovery resource pool, and the transmission power and the number of repetitive transmissions which may be used in the corresponding discovery resource pool without using the pre-mapped relationship used in the implicit method.

Since UEs performing type 2 D2D are in the RRC_Connected state, the eNB schedules time-frequency resources to be used for the D2D transmission by the type 2 D2D UEs. Such scheduling information may be provided to the D2D transmission UEs by the eNB through a downlink control channel (PDCCH) or through RRC signaling. At this time, the eNB may explicitly inform the type 2 D2D UEs of D2D transmission power and the number of repetitive transmissions which will be used in the allocated time-frequency resources. In order to combine and then decode received discovery messages, the type 2 D2D reception UEs should know the number of repetitive transmissions. To this end, the eNB may directly broadcast the number of repetitive transmissions to all D2D UEs within the cell through the SIB or may implicitly inform the UEs through mapping between the resource pool and the number of repetitive transmissions. When the resource pool and the number of repetitive transmission are mapped, the D2D reception UEs may receive resource pool information through the SIB and may implicitly know the number of repetitive transmissions in each pool.

The eNB may inform the type 2 D2D transmission UEs of only positions of time-frequency resources, and the type 2 D2D transmission UEs may implicitly know the transmission power and the number of repetitive transmissions which the UEs will use in positions of the resources allocated by the eNB through the predefined mapping relationship.

Figure 16:
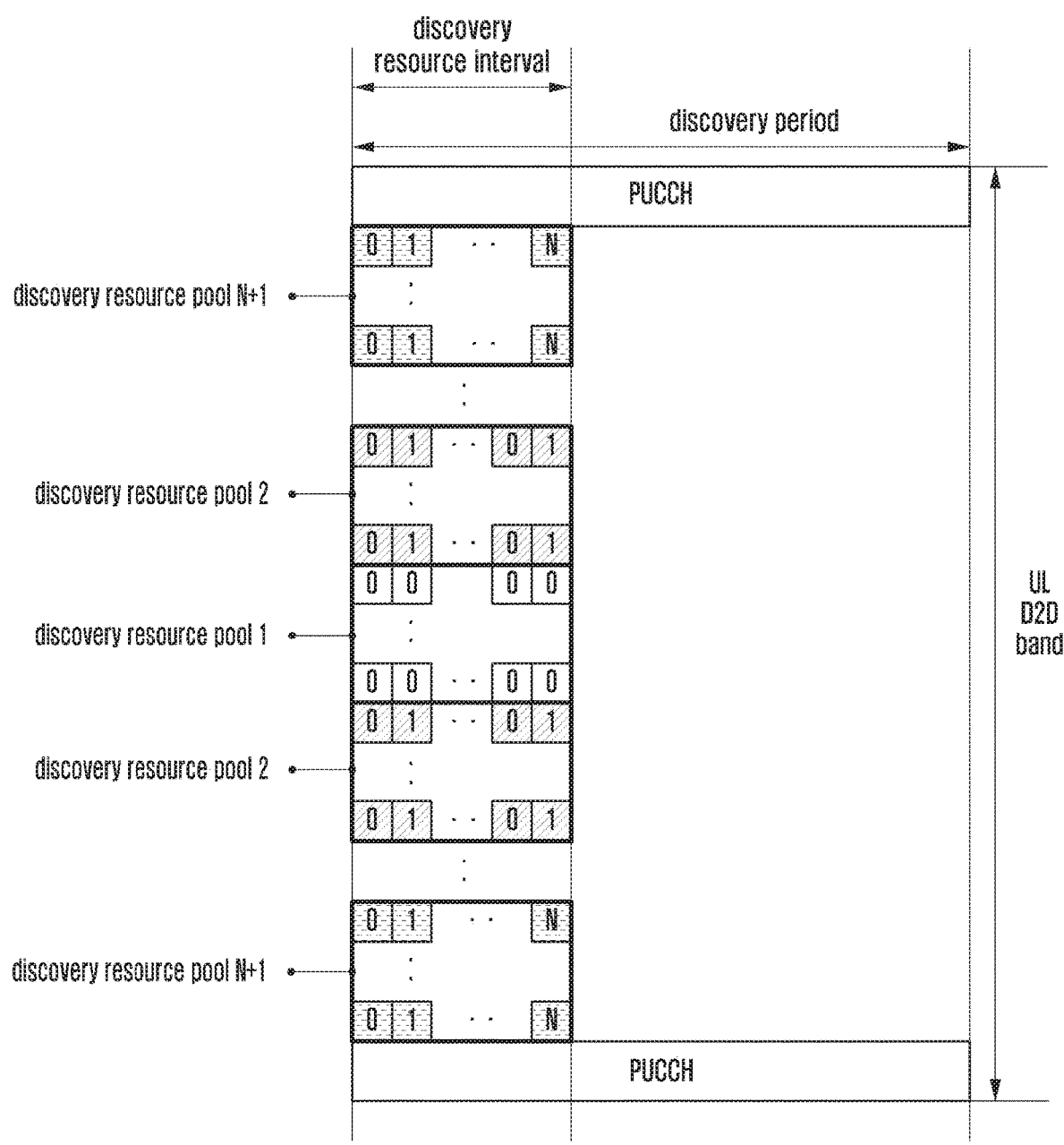
FIG. 16 illustrates an embodiment for maintaining the D2D communication range and shows an operation in which power control, resource allocation, and repetition are connected when discovery resource pools are frequency division-multiplexed and used (repetition on a time axis) according to an embodiment of the present disclosure.

FIG. 16 illustrates an embodiment for maintaining a range of a D2D communication according to an embodiment of the present disclosure.

Referring to FIG. 16, when discovery resource pools are frequency division-multiplexed, an operation in which power control, resource allocation, and repetition are connected is illustrated (repetition on the time axis).

An operation in which power control, resource allocation, and repetition are connected when discovery resource pools are frequency division-multiplexed is illustrated herein. A difference between FIG. 16 and FIG. 15 is that repetitive transmission is performed on the time axis in the discovery resource pool in FIG. 16 unlink FIG. 15 in which repetitive transmission is performed on the frequency axis in the discovery resource pool.

Referring to FIG. 16, since UEs performing D2D transmission in discovery resource pool N+1 adjacent to the PUCCH use low transmission power to mitigate the IBE and ICI problems which the UEs may cause in the PUCCH, the UEs may maintain the discovery range through N repetitive transmissions. Since UEs performing D2D transmission in discovery resource pool 1 spaced far away from the PUCCH may use high transmission power, the UEs may perform the D2D transmission without separate repetitive transmission.

Figure 17:
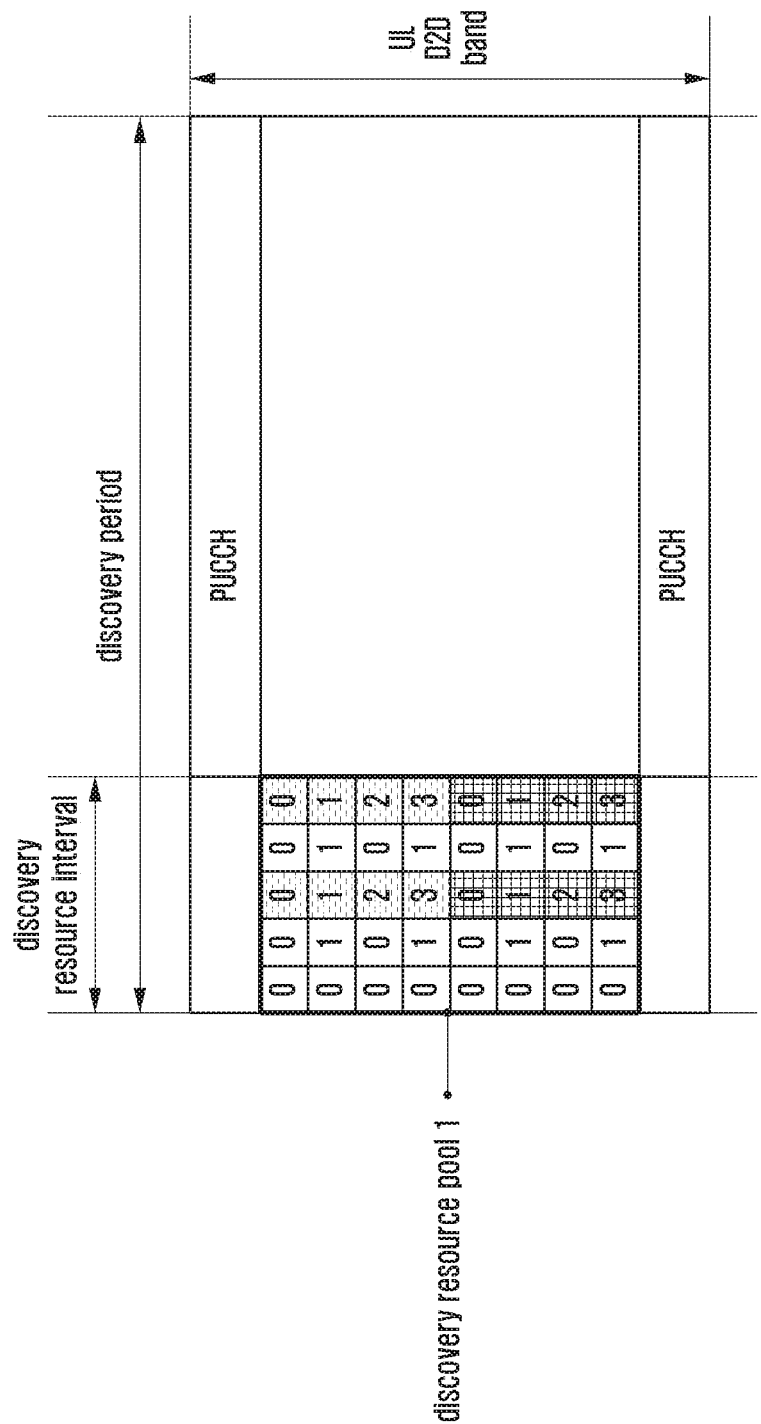
FIG. 17 illustrates an embodiment for maintaining the D2D communication range and shows a case where a number of repetitive transmissions varies depending on a position of a discovery resource on a time axis in one resource pool existing within one discovery period according to an embodiment of the present disclosure.

FIG. 17 illustrates an embodiment for maintaining the range of the D2D communication according to an embodiment of the present disclosure. Referring to FIG. 17, the number of repetitive transmissions may vary depending on a position of the discovery resource of the time axis in one resource pool existing within one discovery period.

More specifically, FIG. 17 illustrates a case where the number of repetitive transmissions is different according to the position of the discovery resource of the time axis in one resource pool existing within one discovery period. That is, the discovery resources on a first time axis are transmitted without any repetitive transmission (indicated by 0), the discovery resources on a second time axis are transmitted using initial transmission (indicated by 0) and one repetitive transmission (indicated by 1), and the discovery resources on a third time axis are transmitted using initial transmission (indicated by 0), one repetitive transmission (indicated by 1), and two repetitive transmissions (indicated by 2). At this time, the size of each discovery resource means 2-Physical RB (PRB) pair or 3-PRB pair consecutive on the frequency axis. When the normal CP is used, 1-PRB pair includes 14 symbols on the time axis and 12 carriers on the frequency axis. When the extended CP is used, 1-PRB pair includes 12 symbols on the time axis and 12 carriers on the frequency axis.

UEs performing type 1 discovery should know in advance how the discovery resources are arranged on the time axis and the frequency axis within the discovery resource pool. The information may be provided by the eNB to D2D UEs through the SIB in the form of a table in which discovery resources and the numbers of repetitive transmissions are mapped, or may be stored in all D2D UEs.

UEs performing type 2D discovery may explicitly receive the number of repetitive transmissions and discovery resources on the time/frequency axis during a D2D grant process through RRC signaling or PDCCH while the eNB allocates D2D transmission resources. Further, the eNB may allocate only D2D transmission resources on the time/frequency axis, and the corresponding D2D transmission resources may be implicitly mapped to the number of repetitive transmissions within the discovery resource pool. For example, when the eNB allocates resources indicating 3 on the time axis to a particular D2D transmission UE in FIG. 13, the corresponding D2D transmission UE may implicitly know that four repetitive transmissions should be performed. At this time, the eNB should inform the D2D transmission UE of a start point of frequency resources performing the four repetitive transmissions.

Figure 18:
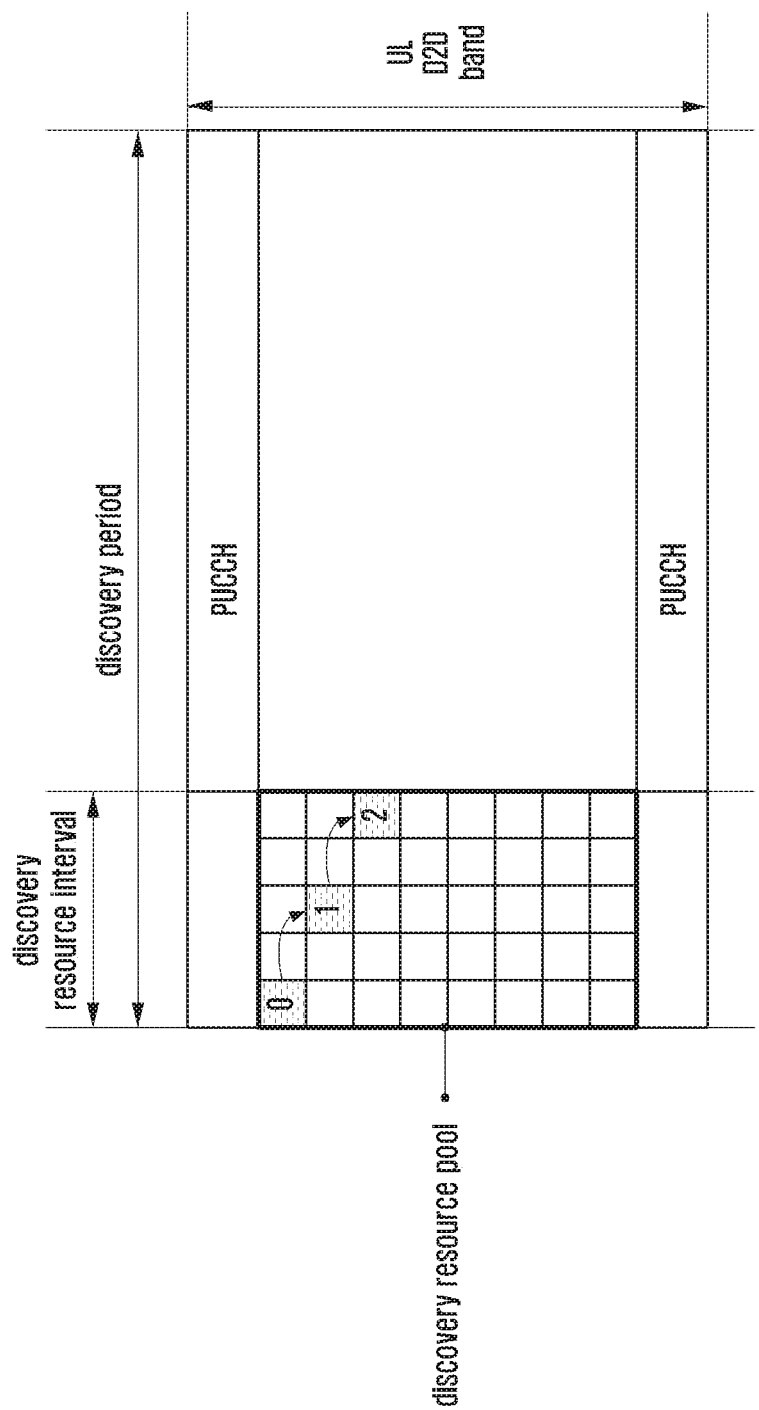
FIG. 18 illustrates an embodiment for maintaining the D2D communication range according to an embodiment of the present invention, and shows a case where there is a particular connection relationship between discovery resources for repetitive transmission performed after one discovery signal transmission and time/frequency resources of first discovery signal transmission according to an embodiment of the present disclosure.

FIG. 18 illustrate an embodiment for maintaining a D2D communication range according to an embodiment of the present disclosure.

Referring to FIG. 18, there is a particular connection relationship between discovery resources for repetitive transmission performed after one discovery signal transmission and time/frequency resources of first discovery signal transmission.

FIG. 18 illustrates a case where there is a particular connection relationship between discovery resources for repetitive transmission performed after one discovery signal transmission and time/frequency resources of first discovery signal transmission is illustrated. The connection relationship is called a pattern of discovery resources, and the D2D transmission UE, which selects resources indicated by 0 through an energy sensor or random resource selection method, performs repetitive transmission of discovery resources by using resources indicated by 1 and 2 based on a predefined pattern of discovery resources. The D2D reception UE combines resources indicated by 0, 1, and 2 by using a predefined pattern of discovery resources through a chase combining or incremental redundancy method, and decodes the corresponding discovery signal. At this time, in the pattern of the discovery resources, a transmission position of a first discovery signal may be mapped to the pattern of repetitive transmission of all discovery signals after the first discovery signal. In type 1 discovery, frequency resources of the first discovery signal and time/frequency positions of repeatedly transmitted discovery resources may be mapped in the form of a table. The mapping may be stored in the UE, or may be provided by the eNB to D2D UEs through the SIB. In type 2B discovery, the eNB may inform the UE of the pattern in the bit map form (e.g., former x bits indicate a frequency index and latter y bits indicate whether repetitive transmissions are performed).

Each D2D transmission UE may inform the D2D reception UE of whether initial transmission and repetitive transmission are performed by using two De-Modulation Reference Signal (DMRS) or two DMRS sets as well as the aforementioned predefined pattern of the discovery resources. For example, when it is assumed that DMRS-A (or DMRS set A) indicates initial transmission, DMRS-B (or DMRS set B) indicates repetitive transmission, and four repetitive transmissions are performed, the D2D transmission UE may map DMRS-A, DMRS-B, DMRS-B, and DMRS-B to D2D discovery resources and perform the transmission. When decoding each D2D discovery resource, the D2D reception UE performs channel estimation by using the DMRS. At this time, the D2D reception UE blindly detects which one between the DMRS-A and the DMRS-B is transmitted from the D2D transmission UE, and may determine whether the transmission of the corresponding D2D discovery resources corresponds to the initial transmission or the repetitive transmission.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a terminal in a wireless communication system, the method comprising:
receiving, from a base station, configuration information on one or more resource pools, wherein the configuration information includes each of resource pool configurations, a first resource pool configuration including resource information for a first resource pool, information indicating a threshold number of resources associated with the first resource pool in which the terminal is able to transmit a signal, and transmission power control information for the first resource pool;
identifying a number of resources associated with the first resource pool based on the threshold number, the number of resources being smaller than or equal to the threshold number;
identifying at least one resource for transmitting the signal in the first resource pool based on the identified number of resources and a predefined pattern; and
transmitting, to another terminal, the signal on the at least one identified resource in the first resource pool using a transmission power based on the transmission power control information.

2. The method of claim 1, wherein the configuration information is included in system information.

3. The method of claim 1,
wherein the transmission power control information comprises a value of a transmission power parameter $P_0$ and a value of a path-loss coefficient $\alpha$ associated with the first resource pool.

4. The method of claim 1, wherein the signal which is transmitted on the at least one resource is combined to be decoded by a terminal which receives the signal.

5. A method of a base station in a wireless communication system, the method comprising:
identifying resource information of a first resource pool, a threshold number of resources associated with the first resource pool in which a terminal is able to transmit a signal, and transmission power control information for the first resource pool; and
transmitting, to the terminal, configuration information on one or more resource pools, wherein the configuration information includes each of resource pool configurations, a first resource pool configuration including the resource information of the first resource pool, the information indicating the threshold number of the resources associated with the first resource pool, and the transmission power control information for the first resource pool,
wherein at least one resource for transmitting the signal in the first resource pool is identified based on a number of resources, on according to the threshold number, and a predefined pattern, the number of resources being smaller than or equal to the threshold number, and
wherein the signal is transmitted on the at least one resource using a transmission power based on the transmission power control information.

6. The method of claim 5, wherein the configuration information is included in system information.

7. The method of claim 5,
wherein the transmission power control information comprises a value of a transmission power parameter $P_0$ and a value of a path-loss coefficient $\alpha$ associated with the first resource pool.

8. The method of claim 5, wherein the signal which is transmitted on the at least one resource is combined to be decoded by a terminal which receives the signal.

9. A terminal in a wireless communication system, the terminal comprising:

a transceiver; and a controller configured to:

receive, from a base station via the transceiver, configuration information on one or more resource pools, wherein the configuration information includes each of resource pool configurations, a first resource pool configuration including resource information for a first resource pool, information indicating a threshold number of resources associated with the first resource pool in which the terminal is able to transmit a signal, and transmission power control information for the first resource pool, identify a number of resources associated with the first resource pool based on the threshold number, the number of resources being smaller than or equal to the threshold number, identify at least one resource for transmitting the signal in the first resource pool based on the identified number of resources and a predefined pattern, and transmit, to another terminal via the transceiver, the signal on the at least one identified resource in the first resource pool using a transmission power based on the transmission power control information.

10. The terminal of claim 9, wherein the configuration information is included in system information.

11. The terminal of claim 9, wherein the transmission power control information comprises a value of a transmission power parameter $P_0$ and a value of a path-loss coefficient α associated with the first resource pool.

12. The terminal of claim 9, wherein the signal which is transmitted on the at least one resource is combined to be decoded by a terminal which receives the signal.

13. A base station in a wireless communication system, the base station comprising:

a transceiver; and a controller configured to:

identify resource information of a first resource pool, a threshold number of resources associated with the first resource pool in which a terminal is able to transmit a signal, and transmission power control information for the first resource pool, and transmit, to the terminal via the transceiver, configuration information on one or more resource pools, wherein the configuration information includes each of resource pool configurations, a first resource pool configuration including the resource information of the first resource pool, the information indicating the threshold number of the resources associated with the first resource pool, and the transmission power control information for the first resource pool, wherein at least one resource for transmitting the signal in the resource pool is identified based on a number of resources, according to the threshold number, and a predefined pattern, the number of resources being smaller than or equal to the threshold number, and wherein the signal is transmitted on the at least one resource using a transmission power based on the transmission power control information.

14. The base station of claim 13, wherein the configuration information is included in system information.

15. The base station of claim 13, wherein the transmission power control information comprises a value of a transmission power parameter Po and a value of a path-loss coefficient a associated with the first resource pool.

16. The base station of claim 13, wherein the signal which is transmitted on the at least one resource is combined to be decoded by a terminal which receives the signal.

* * * * *